(12) United States Patent
Kubota et al.

(10) Patent No.: US 9,122,110 B2
(45) Date of Patent: Sep. 1, 2015

(54) LIQUID CRYSTAL DISPLAY DEVICE

(71) Applicant: SEMICONDUCTOR ENERGY LABORATORY CO., LTD., Atsugi-shi, Kanagawa-ken (JP)

(72) Inventors: Daisuke Kubota, Kanagawa (JP); Akio Yamashita, Kanagawa (JP); Masaru Nakano, Kanagawa (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 312 days.

(21) Appl. No.: 13/674,143

(22) Filed: Nov. 12, 2012

(65) Prior Publication Data
US 2013/0135563 A1    May 30, 2013

(30) Foreign Application Priority Data

Nov. 28, 2011    (JP) .................. 2011-258959

(51) Int. Cl.
*G02F 1/1343*    (2006.01)
*G02F 1/1337*    (2006.01)

(52) U.S. Cl.
CPC ...... *G02F 1/134363* (2013.01); *G02F 1/13439* (2013.01); *G02F 2001/134381* (2013.01)

(58) Field of Classification Search
CPC ............... G02F 1/133707; G02F 2001/13398; G02F 1/134363; G02F 2001/13793; G02F 2001/134381; G02F 1/13439
USPC .................................... 349/96, 141, 142, 144
See application file for complete search history.

(56) References Cited

U.S. PATENT DOCUMENTS

| 6,072,557 A | 6/2000 | Kishimoto |
| 6,097,465 A | 8/2000 | Hiroki et al. |
| 6,115,093 A | 9/2000 | Murai et al. |
| 6,175,395 B1 | 1/2001 | Yamazaki et al. |

(Continued)

FOREIGN PATENT DOCUMENTS

| CN | 102162955 A | 8/2011 |
| JP | 09-258242 | 10/1999 |

(Continued)

OTHER PUBLICATIONS

International Search Report (Application No. PCT/JP2012/079872; PCT16144) Dated Feb. 12, 2013.

(Continued)

*Primary Examiner* — Michael Caley
*Assistant Examiner* — Jia Pan
(74) *Attorney, Agent, or Firm* — Nixon Peabody LLP; Jeffrey L. Costellia

(57) ABSTRACT

A first polarizing plate having a polarization axis in a first direction, a second polarizing plate having a polarization axis in a second direction orthogonal to the first direction, a plurality of first structure bodies provided for the first substrate, a plurality of second structure bodies provided for the first substrate, a first electrode layer covering top surfaces and side surfaces of the plurality of first structure bodies, a second electrode layer covering top surfaces and side surfaces of the plurality of second structure bodies, and a third electrode layer that is provided for a second substrate and overlaps at least partly with the second electrode layer are provided. The side surfaces of the first structure bodies and the side surfaces of the second structure bodies are parallel to the first direction or the second direction.

20 Claims, 10 Drawing Sheets

(56) References Cited

U.S. PATENT DOCUMENTS

| | | | |
|---|---|---|---|
| 6,437,845 B1 | 8/2002 | Yamada et al. | |
| 6,583,840 B1 * | 6/2003 | Inoue et al. | 349/141 |
| 7,038,754 B2 | 5/2006 | Hirakata et al. | |
| 7,211,825 B2 | 5/2007 | Shih et al | |
| 7,256,851 B2 | 8/2007 | Park | |
| 7,327,433 B2 | 2/2008 | Miyachi et al. | |
| 7,342,632 B2 | 3/2008 | Miyachi et al. | |
| 7,362,400 B2 | 4/2008 | Itou et al. | |
| 7,576,829 B2 | 8/2009 | Kikuchi et al. | |
| 8,120,746 B2 | 2/2012 | Shibahara et al. | |
| 8,223,305 B2 * | 7/2012 | Park et al. | 349/129 |
| 8,355,109 B2 | 1/2013 | Kubota et al. | |
| 8,368,854 B2 | 2/2013 | Nishi et al. | |
| 8,395,740 B2 | 3/2013 | Kubota et al. | |
| 8,654,292 B2 | 2/2014 | Kubota et al. | |
| 8,786,811 B2 * | 7/2014 | Kubota et al. | 349/141 |
| 2002/0024298 A1 | 2/2002 | Fukunaga | |
| 2002/0113930 A1 | 8/2002 | Satake | |
| 2003/0025118 A1 | 2/2003 | Yamazaki et al. | |
| 2005/0179847 A1 * | 8/2005 | Miyachi et al. | 349/141 |
| 2005/0237472 A1 | 10/2005 | Shibahara et al. | |
| 2006/0203169 A1 | 9/2006 | Ozawa et al. | |
| 2006/0227283 A1 | 10/2006 | Ooi et al. | |
| 2007/0126969 A1 | 6/2007 | Kimura et al. | |
| 2007/0146591 A1 | 6/2007 | Kimura et al. | |
| 2008/0136990 A1 | 6/2008 | Kimura | |
| 2008/0259254 A1 | 10/2008 | Kikuchi et al. | |
| 2009/0009865 A1 | 1/2009 | Nishida et al. | |
| 2009/0153761 A1 | 6/2009 | Park et al. | |
| 2009/0161042 A1 | 6/2009 | Inoue et al. | |
| 2009/0219466 A1 | 9/2009 | Kagawa et al. | |
| 2009/0219478 A1 | 9/2009 | Park et al. | |
| 2010/0110306 A1 * | 5/2010 | Yamada | 348/731 |
| 2010/0165280 A1 | 7/2010 | Ishitani et al. | |
| 2010/0182558 A1 * | 7/2010 | Lu et al. | 349/141 |
| 2010/0231842 A1 | 9/2010 | Ishitani et al. | |
| 2010/0328565 A1 | 12/2010 | Kubota et al. | |
| 2011/0063553 A1 * | 3/2011 | Hanaoka et al. | 349/123 |
| 2011/0096255 A1 | 4/2011 | Rho et al. | |
| 2011/0122332 A1 * | 5/2011 | Kubota et al. | 349/44 |
| 2011/0128491 A1 * | 6/2011 | Kubota et al. | 349/139 |
| 2011/0134350 A1 * | 6/2011 | Yamazaki et al. | 349/43 |
| 2011/0249228 A1 | 10/2011 | Kubota et al. | |
| 2011/0249229 A1 | 10/2011 | Kubota et al. | |
| 2012/0069283 A1 | 3/2012 | Kizu et al. | |
| 2012/0212693 A1 | 8/2012 | Kubota et al. | |
| 2013/0128207 A1 | 5/2013 | Nakano et al. | |

FOREIGN PATENT DOCUMENTS

| | | |
|---|---|---|
| JP | 2005-227760 | 8/2005 |
| JP | 2011-027886 | 2/2011 |
| JP | 2011-133874 | 7/2011 |
| JP | 2011-237778 | 11/2011 |
| JP | 2011-237779 | 11/2011 |
| KR | 2011-0058693 A | 6/2011 |
| KR | 2011-0114460 | 10/2011 |
| KR | 2011-0114466 | 10/2011 |
| TW | 201207489 A1 | 2/2012 |
| TW | 201207519 A1 | 2/2012 |
| TW | 201207521 A1 | 2/2012 |
| WO | WO-2005-090520 A1 | 9/2005 |

OTHER PUBLICATIONS

Written Opinion (Application No. PCT/JP2012/079872; PCT16144) Dated Feb. 12, 2013.

* cited by examiner

Prior-Art

Prior-Art

Prior-Art

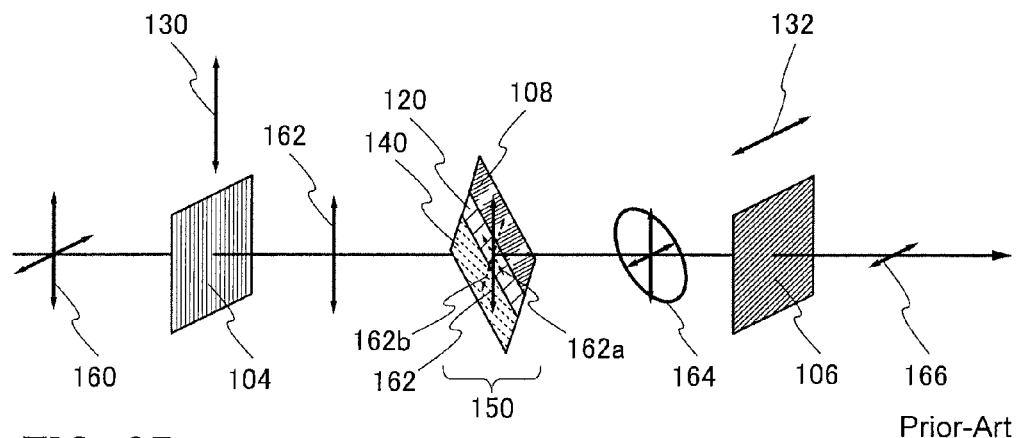
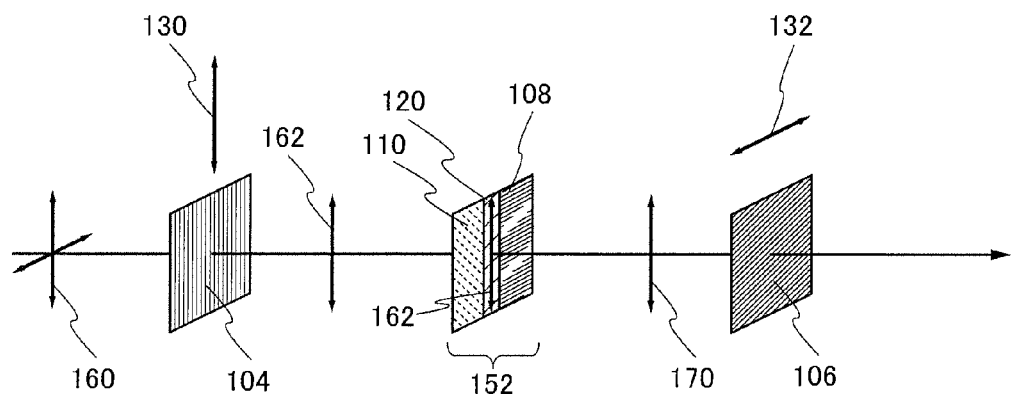
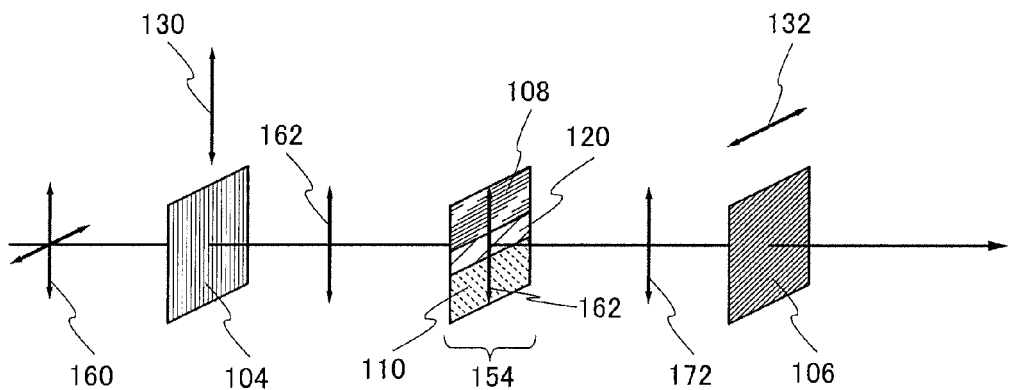

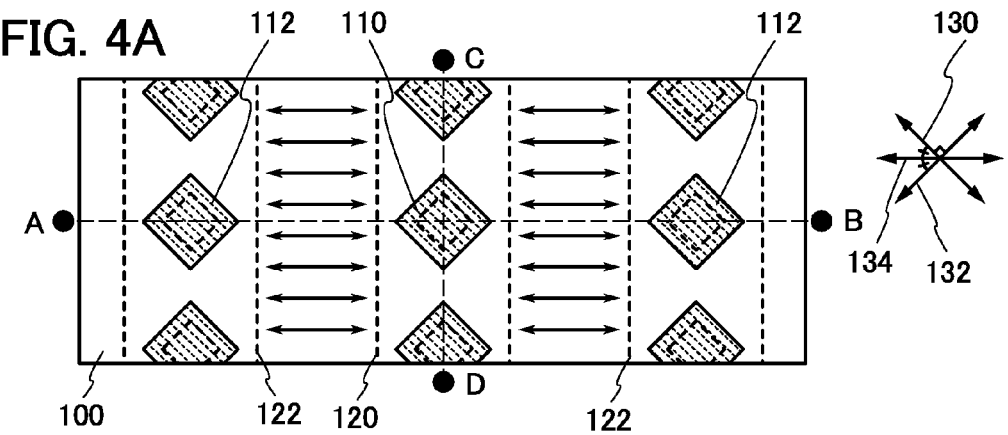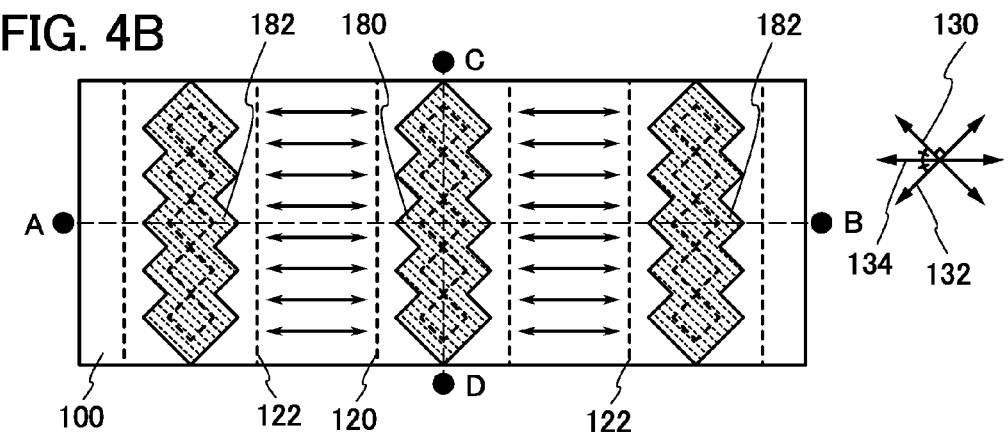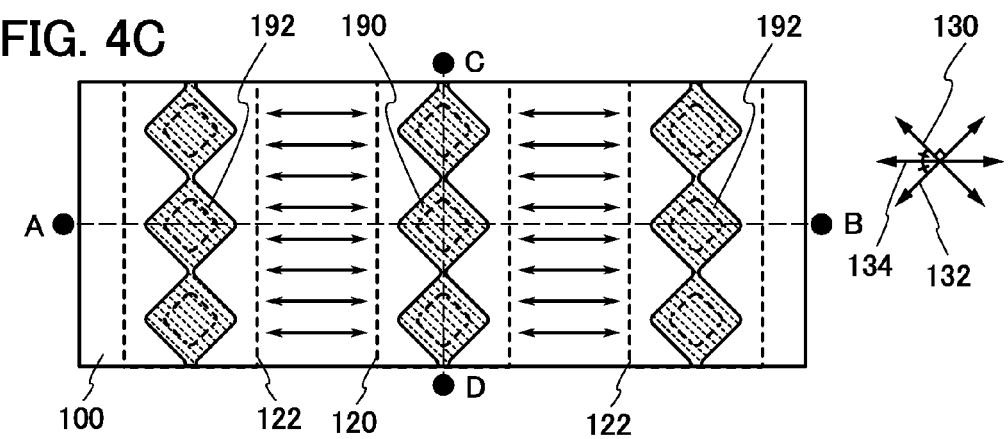

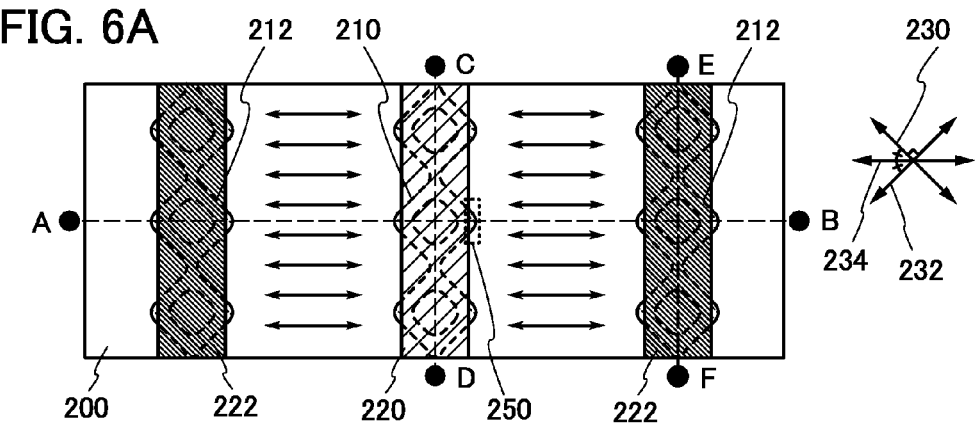
FIG. 6A
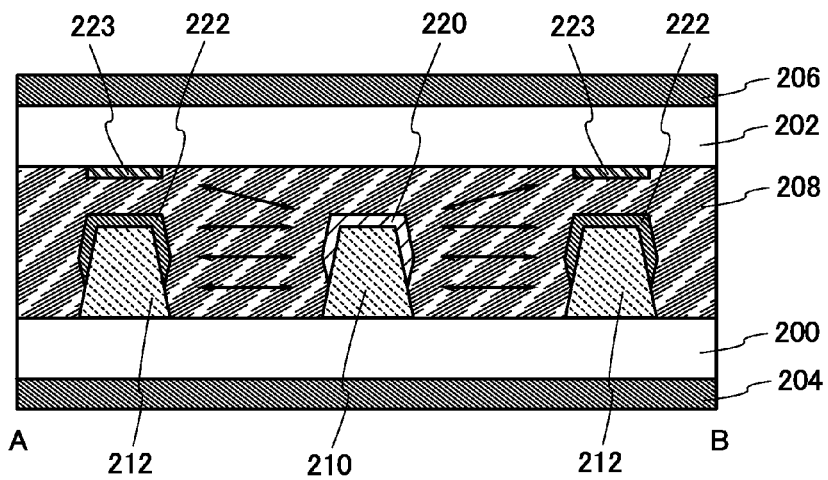
FIG. 6B
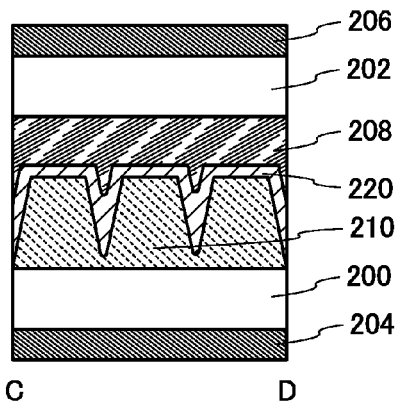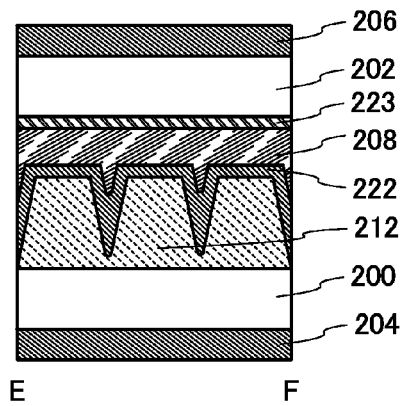
FIG. 6C  FIG. 6D

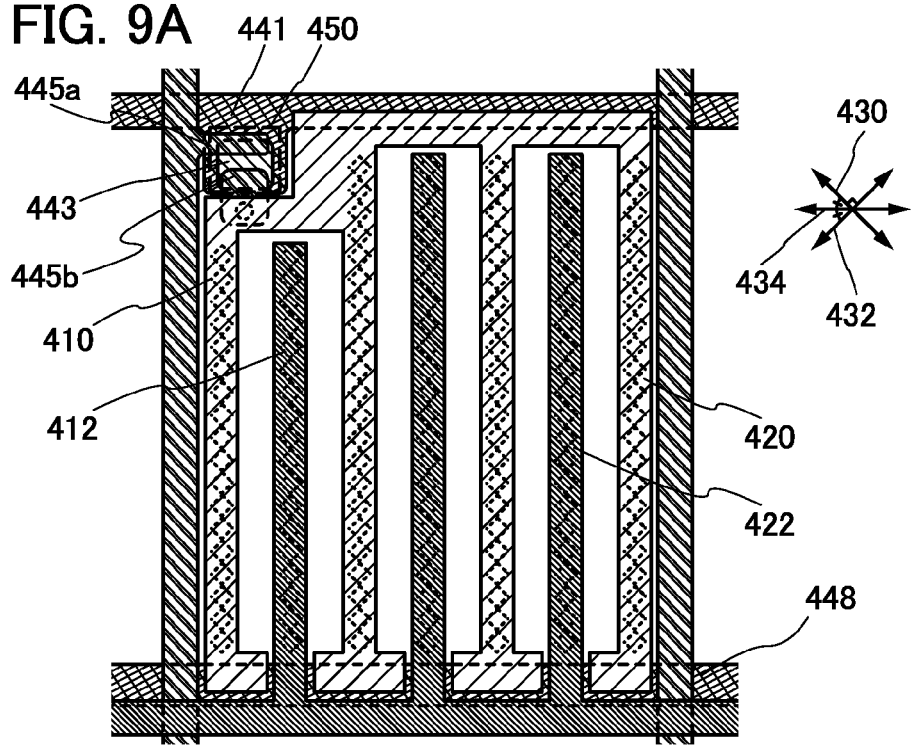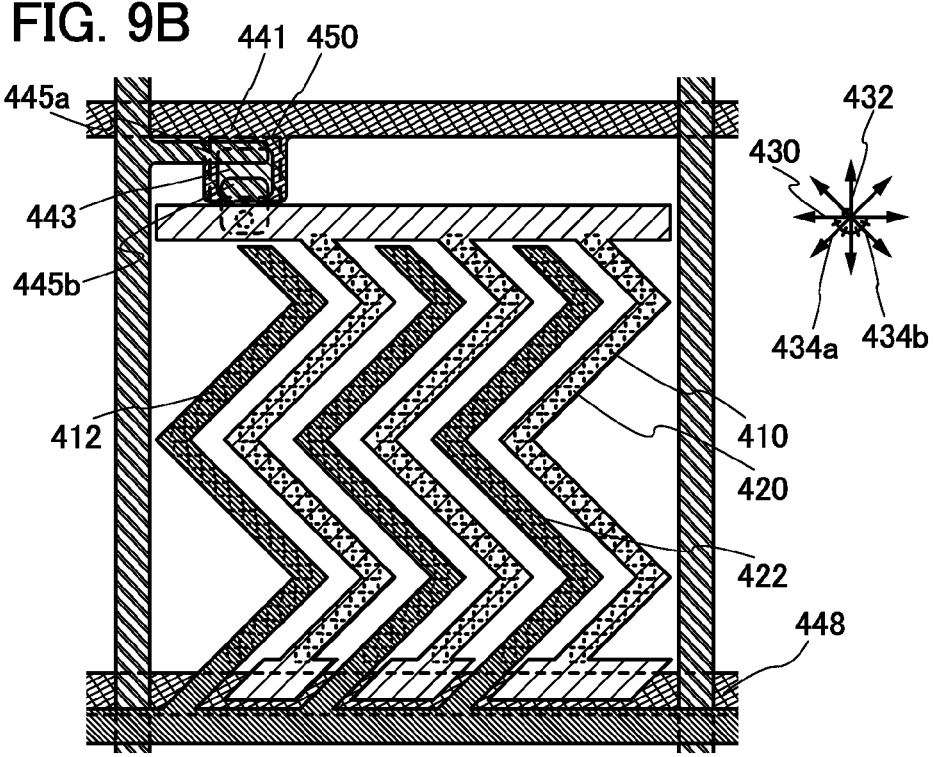

LIQUID CRYSTAL DISPLAY DEVICE

TECHNICAL FIELD

The present invention relates to liquid crystal display devices, particularly to a horizontal electric field-mode active matrix liquid crystal display device.

BACKGROUND ART

In recent years, flat panel displays have been used in a variety of electronic devices such as televisions, personal computers, and mobile phones. Most of the flat panel displays are liquid crystal displays (liquid crystal display devices) which utilize electric field responsiveness of a liquid crystal element.

As a typical display method of a liquid crystal display device, a twisted nematic (TN) mode is employed. However, a TN-mode liquid crystal display device, in which an electric field is applied perpendicularly to a liquid crystal layer, has a disadvantage of a large change in color or luminance due to viewing angle dependence, that is, narrowness of the normal viewing angle.

By contrast, a horizontal electric field mode such as an in-plane-switching (IPS) mode can be given as a display method of a liquid crystal display device which is often used besides a TN mode. In a horizontal electric field mode, liquid crystal molecules are driven by application of an electric field that is parallel to a substrate, unlike in a TN mode. Accordingly, a horizontal electric field-mode liquid crystal display device can have a wider viewing angle than a TN-mode liquid crystal display device. However, a horizontal electric field mode still has problems in contrast ratio, response time, and the like.

A ferroelectric liquid crystal (FLC) mode, an optical compensated birefringence (OCB) mode, and a mode using a liquid crystal exhibiting a blue phase can be given as display modes in which the response time of liquid crystal molecules is shortened.

In particular, a display mode using a liquid crystal exhibiting a blue phase has a variety of advantages such as nonnecessity of an alignment film and a wide viewing angle as well as short response time. Although a liquid crystal exhibiting a blue phase has had a disadvantage of a narrow temperature range in which the blue phase is exhibited, researches have been made in which the temperature range is expanded by performing polymer stabilization treatment on the liquid crystal (e.g., see Patent Document 1).

In addition, in a liquid crystal display device using a liquid crystal exhibiting a blue phase, voltage higher than that for a liquid crystal used in a conventional display mode needs to be applied. Particularly in the case where a liquid crystal exhibiting a blue phase is used in a horizontal electric field-mode liquid crystal display device, an electric field needs to be horizontally applied to a liquid crystal layer and thus still higher voltage is required. As a countermeasure against this, an attempt to reduce driving voltage has been made in which a comb-like electrode is formed by forming an electrode layer so as to cover even a side surface of a convex-shaped insulating layer, whereby the area of the electrode in the substrate normal direction is increased (e.g., see Patent Document 2).

REFERENCE

[Patent Document 1] PCT International Publication No. 05/090520

[Patent Document 2] Japanese Published Patent Application No. 2005-227760

DISCLOSURE OF INVENTION

However, if a comb-like electrode is formed by forming an electrode layer so as to cover even a side surface of a convex-shaped insulating layer as disclosed in Patent Document 2, a problem arises in that light leakage is caused in the vicinity of an electrode layer of a pixel where black display is performed. Such light leakage in a pixel where black display is performed decreases the contrast ratio of a display device, which is the ratio of white transmittance (light transmittance in white display) to black transmittance (light transmittance in black display).

This is probably because, since the comb-like electrode is formed by forming the electrode layer so as to cover even the side surface of the convex-shaped insulating layer, structural birefringence is caused owing to differences between the refractive indices of the convex-shaped insulating layer and the electrode layer and between the refractive indices of a liquid crystal layer and the electrode layer. In other words, a layer including the convex-shaped insulating layer, the electrode layer, and the liquid crystal layer functions like a retardation plate, thereby converting light emitted through the liquid crystal layer, which is to be emitted as linearly polarized light originally, into elliptically polarized light. Consequently, part of light which is to be absorbed by a polarizing plate on an emission side passes through the polarizing plate on the emission side at the time of black display, and light leakage is caused in a pixel where black display is performed.

Such a problem arises not only in a mode using a liquid crystal exhibiting a blue phase as disclosed in Patent Document 2 but also in a general liquid crystal display device using a horizontal electric field mode, in which a comb-like electrode is formed by forming an electrode layer so as to cover a convex-shaped insulating layer for reduction in driving voltage.

There has been another problem in that it is difficult to sufficiently reduce driving voltage only by forming a comb-like electrode such that an electrode layer is formed to cover even a side surface of a convex-shaped insulating layer as disclosed in Patent Document 2. When the driving voltage of a liquid crystal display device is high, a pixel where white display is performed cannot transmit light sufficiently, resulting in a decrease in the white transmittance of the liquid crystal display device. Consequently, the contrast ratio of the liquid crystal display device is decreased.

In view of the foregoing problems, an object of one embodiment of the present invention is to provide a liquid crystal display device using a horizontal electric field mode, particularly a liquid crystal display device using a liquid crystal exhibiting a blue phase, in which light leakage in a pixel where black display is performed is reduced to improve contrast ratio. Another object of one embodiment of the present invention is to provide a liquid crystal display device using a horizontal electric field mode, particularly a liquid crystal display device using a liquid crystal exhibiting a blue phase, in which the transmittance in a pixel where white display is performed is improved to improve contrast ratio.

One embodiment of the invention disclosed herein is a liquid crystal display device including a first polarizing plate that is provided for a first substrate and has a polarization axis in a first direction, a second polarizing plate that is provided for a second substrate and has a polarization axis in a second direction orthogonal to the first direction, a liquid crystal layer between the first substrate and the second substrate, a plurality of first structure bodies provided to project from a surface of the first substrate on a liquid crystal layer side into the liquid crystal layer, a plurality of second structure bodies provided to project from the surface of the first substrate on the liquid crystal layer side into the liquid crystal layer, a first electrode layer covering top surfaces and side surfaces of the plurality of first structure bodies, a second electrode layer covering top surfaces and side surfaces of the plurality of second structure bodies, and a third electrode layer provided on a surface of the second substrate on a liquid crystal layer side so as to overlap at least partly with the second electrode layer. The side surfaces of the first structure bodies and the side surfaces of the second structure bodies are parallel to the first direction or the second direction. The direction of an electric field generated in the liquid crystal layer between the first electrode layer and the second electrode layer is a third direction that equally divides an angle formed by the first direction and the second direction. The direction of a planar-direction component of an electric field generated in the liquid crystal layer between the first electrode layer and the third electrode layer is the third direction that equally divides the angle formed by the first direction and the second direction.

The plurality of first structure bodies is preferably arranged to be orthogonal to the third direction. The plurality of second structure bodies is preferably arranged to face a row of the plurality of first structure bodies at a given interval and to be orthogonal to the third direction. The first electrode layer and the second electrode layer are preferably provided to face each other at a given interval and to be orthogonal to the third direction. The third electrode layer is preferably provided to overlap at least partly with the second electrode layer and to be orthogonal to the third direction. Further, the first structure bodies and the second structure bodies may each have a substantially square-shaped bottom surface.

Further, corner portions of the bottom surfaces of the plurality of first structure bodies and corner portions formed between the top surfaces and bottom surfaces of the first structure bodies may be chamfered in a circular arc shape. The first structure bodies may be connected in a row. Corner portions of the bottom surfaces of the plurality of second structure bodies and corner portions formed between the top surfaces and bottom surfaces of the second structure bodies may be chamfered in a circular arc shape. The second structure bodies may be connected in a row. Further, the first electrode layer may be provided so that the corner portions of the bottom surfaces of the plurality of first structure bodies and the corner portions formed between the top surfaces and bottom surfaces of the first structure bodies, which are chamfered in the circular arc shape, are exposed. The second electrode layer may be provided so that the corner portions of the bottom surfaces of the plurality of second structure bodies and the corner portions formed between the top surfaces and bottom surfaces of the second structure bodies, which are chamfered in the circular arc shape, are exposed. Further, the width of the first electrode layer in the third direction may be smaller than the width of the first structure body in the third direction. The width of the second electrode layer in the third direction may be smaller than the width of the second structure body in the third direction.

It is preferable that the first electrode layer, the first structure bodies, the second electrode layer, the second structure bodies, and the third electrode layer each have a light-transmitting property.

Further, the side surfaces of the first structure bodies and the side surfaces of the second structure bodies are preferably tilted toward the first substrate. Further, it is preferable that the plurality of first structure bodies and the first electrode layer, the plurality of second structure bodies and the second electrode layer, and the third electrode layer each have a comb-like shape.

Another embodiment of the invention disclosed herein is a liquid crystal display device including a first polarizing plate that is provided for a first substrate and has a polarization axis in a first direction, a second polarizing plate that is provided for a second substrate and has a polarization axis in a second direction orthogonal to the first direction, a liquid crystal layer between the first substrate and the second substrate, a plurality of first structure bodies provided to project from a surface of the first substrate on a liquid crystal layer side into the liquid crystal layer, a plurality of second structure bodies provided to project from the surface of the first substrate on the liquid crystal layer side into the liquid crystal layer, a plurality of third structure bodies provided to project from a surface of the second substrate on a liquid crystal layer side into the liquid crystal layer and to overlap at least partly with the plurality of second structure bodies, a first electrode layer covering top surfaces and side surfaces of the plurality of first structure bodies, a second electrode layer covering top surfaces and side surfaces of the plurality of second structure bodies, and a third electrode layer covering bottom surfaces and side surfaces of the plurality of third structure bodies. The side surfaces of the first structure bodies, the side surfaces of the second structure bodies, and the side surfaces of the third structure bodies are parallel to the first direction or the second direction. The direction of an electric field generated in the liquid crystal layer between the first electrode layer and the second electrode layer is a third direction that equally divides an angle formed by the first direction and the second direction. The direction of a planar-direction component of an electric field generated in the liquid crystal layer between the first electrode layer and the third electrode layer is the third direction that equally divides the angle formed by the first direction and the second direction.

The plurality of first structure bodies is preferably arranged to be orthogonal to the third direction. The plurality of second structure bodies is preferably arranged to face a row of the plurality of first structure bodies at a given interval and to be orthogonal to the third direction. The plurality of third structure bodies is preferably arranged to overlap at least partly with the plurality of second structure bodies and to be orthogonal to the third direction. The first electrode layer and the second electrode layer are preferably provided to face each other at a given interval and to be orthogonal to the third direction. The third electrode layer is preferably provided to overlap at least partly with the second electrode layer and to be orthogonal to the third direction. Further, the first structure bodies, the second structure bodies, and the third structure bodies may each have a substantially square-shaped bottom surface.

It is preferable that the first electrode layer, the first structure bodies, the second electrode layer, the second structure bodies, the third electrode layer, and the third structure bodies each have a light-transmitting property.

Further, the side surfaces of the first structure bodies and the side surfaces of the second structure bodies are preferably tilted toward the first substrate. The side surfaces of the third structure bodies are preferably tilted toward the second substrate. Further, it is preferable that the plurality of first structure bodies and the first electrode layer, the plurality of second structure bodies and the second electrode layer, and the plurality of third structure bodies and the third electrode layer each have a comb-like shape.

Further, the liquid crystal layer preferably includes a liquid crystal material exhibiting a blue phase. A thin film transistor may be provided between the first substrate and the first electrode layer, and the first electrode layer may be electrically connected to a source electrode or a drain electrode of the thin film transistor.

In addition, in this specification and the like, the term "electrode" or "wiring" does not limit a function of a component. For example, an "electrode" is sometimes used as part of a "wiring", and vice versa. In addition, the term "electrode" or "wiring" can also mean a combination of a plurality of "electrodes" or "wirings", for example.

Functions of a "source" and a "drain" are sometimes replaced with each other when a transistor of opposite polarity is used or when the direction of current flow is changed in circuit operation, for example. Therefore, the terms "source" and "drain" can be used to denote the drain and the source, respectively, in this specification.

Note that, in this specification and the like, the expression "electrically connected" includes the case where components are connected through an "object having any electric function". There is no particular limitation on the "object having any electric function" as long as electric signals can be transmitted and received between components that are connected through the object.

Examples of the "object having any electric function" are a switching element such as a transistor, a resistor, an inductor, a capacitor, and an element with a variety of functions as well as an electrode and a wiring.

In this specification and the like, the term "direction" means not only a given direction but also a direction obtained by turning the given direction 180 degrees, that is, a direction opposite to the given direction. In this specification and the like, a "parallel" direction means not only an accurately parallel direction but also a direction within ±10° from the parallel direction, an "orthogonal" direction means not only an accurately orthogonal direction but also a direction within ±10° from the orthogonal direction, and a "perpendicular" direction means not only an accurately perpendicular direction but also a direction within ±10° from the perpendicular direction. In this specification and the like, the expression "an angle is equally divided" means not only the case where the angle is accurately equally divided but also the case where the angle is divided with a margin of error of ±10°. In this specification and the like, the term "right angle" means not only an accurately right angle but also an angle within ±10° from the accurately right angle.

It is possible to provide a liquid crystal display device using a horizontal electric field mode, particularly a liquid crystal display device using a liquid crystal exhibiting a blue phase, in which light leakage in a pixel where black display is performed is reduced to improve contrast ratio. It is also possible to provide a liquid crystal display device using a horizontal electric field mode, particularly a liquid crystal display device using a liquid crystal exhibiting a blue phase, in which the transmittance in a pixel where white display is performed is improved to improve contrast ratio.

BRIEF DESCRIPTION OF DRAWINGS

In the accompanying drawings:

FIGS. 3A to 3C are each a schematic view which illustrates a mechanism of light leakage in a pixel where black display is performed;

FIGS. 4A to 4C are each a plan view which illustrates a liquid crystal display device of one embodiment of the present invention;

FIGS. 6A to 6D are a plan view and cross-sectional views which illustrate a liquid crystal display device of one embodiment of the present invention;

FIGS. 9A and 9B are each a plan view which illustrates a liquid crystal display device of one embodiment of the present invention.

BEST MODE FOR CARRYING OUT THE INVENTION

Figure 1A:
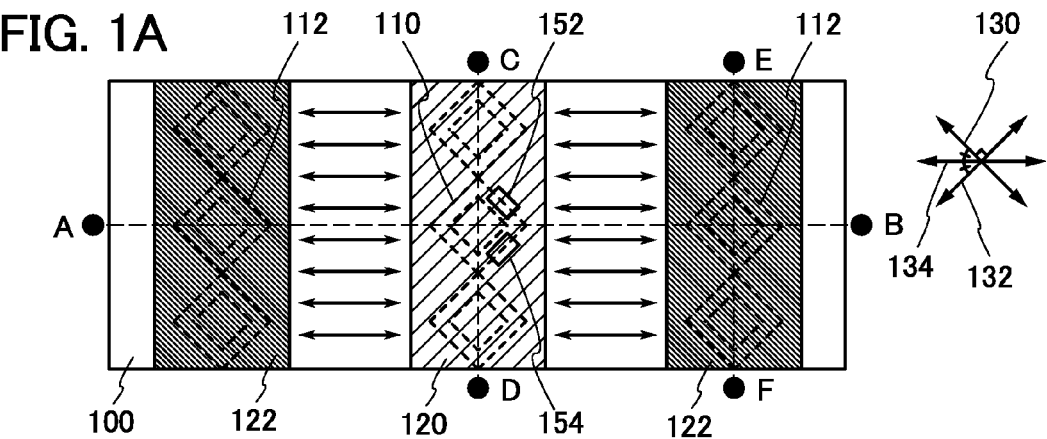
FIGS. 1A to 1D are a plan view and cross-sectional views which illustrate a liquid crystal display device of one embodiment of the present invention.

Embodiments of the present invention will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that, in structures of the present invention described below, the same portions or portions having similar functions are denoted by the same reference numerals in different drawings, and description thereof is not repeated.

Note that, in each drawing referred to in this specification, the size, the layer thickness, or the region of each component is exaggerated for clarity in some cases. Therefore, embodiments of the present invention are not limited to such scales.

Note that terms such as "first", "second", and "third" in this specification and the like are used in order to avoid confusion among components, and the terms do not limit the components numerically. Therefore, for example, the term "first" can be replaced with the term "second", "third", or the like as appropriate.

Embodiment 1

In this embodiment, a liquid crystal display device of one embodiment of the present invention is described with reference to FIGS. 1A to 1D, FIGS. 2A to 2C, FIGS. 3A to 3C, FIGS. 4A to 4C, and FIGS. 5A and 5B.

Figure 1B:
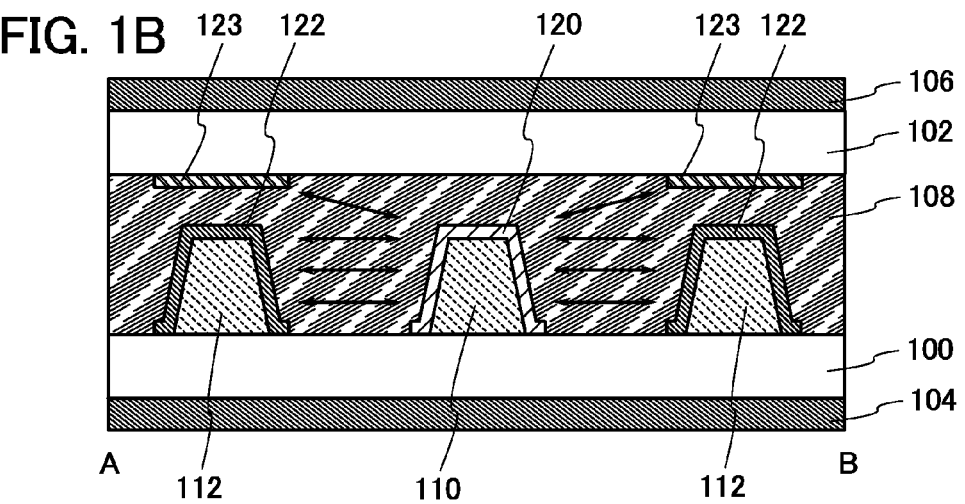
Figure 1C:
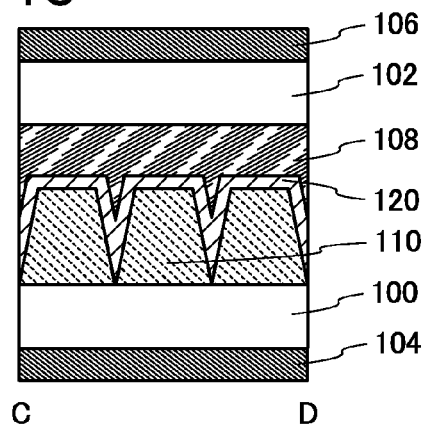
Figure 1D:
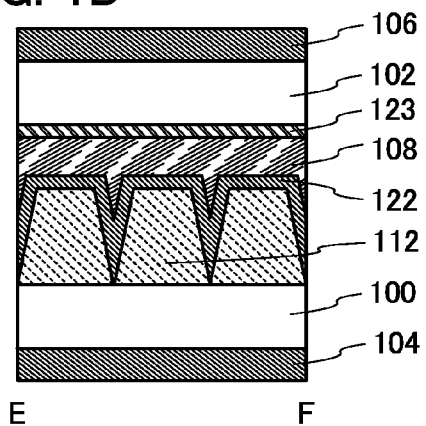

First, a liquid crystal display device of one embodiment of the present invention is described with reference to FIGS. 1A to 1D. FIG. 1A is a plan view of the liquid crystal display device of one embodiment of the present invention, and FIGS. 1B to 1D are cross-sectional views of the liquid crystal display device of one embodiment of the present invention. Here, the cross-sectional view of FIG. 1B is taken along dashed line A-B in FIG. 1A, the cross-sectional view of FIG. 1C is taken along dashed line C-D in FIG. 1A, and the cross-sectional view of FIG. 1D is taken along dashed line E-F in FIG. 1A. Note that a third electrode layer 123 which overlaps with a second electrode layer 122, and the like are not illustrated in FIG. 1A for easy understanding of the drawing.

The liquid crystal display device illustrated in FIGS. 1A to 1D includes a first polarizing plate 104 provided for a first substrate 100, a second polarizing plate 106 provided for a second substrate 102, a plurality of first structure bodies 110 provided to project from a surface of the first substrate 100 on a liquid crystal layer 108 side into the liquid crystal layer 108, a plurality of second structure bodies 112 provided to project from the surface of the first substrate 100 on the liquid crystal layer 108 side into the liquid crystal layer 108, a first electrode layer 120 covering top surfaces and side surfaces of the plurality of first structure bodies 110, the second electrode layer 122 covering top surfaces and side surfaces of the plurality of second structure bodies 112, the third electrode layer 123 provided on a surface of the second substrate 102 on a liquid crystal layer 108 side so as to overlap at least partly with the second electrode layer 122, and the liquid crystal layer 108 provided between the first substrate 100 and the second substrate 102 and in contact with the first electrode layer 120 and the second electrode layer 122.

Here, the first polarizing plate 104 has a polarization axis in a first direction 130 in FIG. 1A, and the second polarizing plate 106 has a polarization axis in a second direction 132 in FIG. 1A that is orthogonal to the first direction 130. In this specification and the like, a polarization axis refers to the vibration direction of linearly polarized light produced by conversion of light which has passed through a polarizer such as a polarizing plate. In addition, in this specification and the like, the term "direction" means not only a given direction but also a direction obtained by turning the given direction 180 degrees, that is, a direction opposite to the given direction. In this specification and the like, a "parallel" direction means not only an accurately parallel direction but also a direction within ±10° from the parallel direction, and an "orthogonal" direction means not only an accurately orthogonal direction but also a direction within ±10° from the orthogonal direction.

Furthermore, an interface between the side surface of the first structure body 110 and the first electrode layer 120 and an interface between the side surface of the second structure body 112 and the second electrode layer 122 are parallel to the first direction 130 or the second direction 132 in FIG. 1A. The first electrode layer 120 and the second electrode layer 122 are provided so that the direction of an electric field generated in the liquid crystal layer 108 between the first electrode layer 120 and the second electrode layer 122 is a third direction 134 that equally divides an angle formed by the first direction 130 and the second direction 132 as illustrated in FIG. 1A. The first electrode layer 120 and the third electrode layer 123 are provided so that the direction of a planar-direction component of an electric field generated in the liquid crystal layer 108 between the first electrode layer 120 and the third electrode layer 123 is the third direction 134 that equally divides the angle formed by the first direction 130 and the second direction 132 as illustrated in FIG. 1A. In this specification and the like, the expression "an angle is equally divided" means not only the case where the angle is accurately equally divided but also the case where the angle is divided with a margin of error of ±10°.

The liquid crystal display device described in this embodiment has the above structure and is a transmissive liquid crystal display device using a horizontal electric field mode. In this embodiment, in particular, a liquid crystal material exhibiting a blue phase is used for the liquid crystal layer 108. The horizontal electric field mode is a display method in which electric fields including a component parallel to the first substrate 100 are generated in the third direction 134 in the liquid crystal layer 108 between the first electrode layer 120 and the second electrode layer 122 and in the liquid crystal layer 108 between the first electrode layer 120 and the third electrode layer 123 as illustrated in FIGS. 1A and 1B.

In the liquid crystal display device described in this embodiment, the first electrode layer 120 is provided to cover the side surface and top surface of the first structure body 110 which projects from the surface of the first substrate 100 on the liquid crystal layer 108 side into the liquid crystal layer 108, and the second electrode layer 122 is provided to cover the side surface and top surface of the second structure body 112 which projects from the surface of the first substrate 100 on the liquid crystal layer 108 side into the liquid crystal layer 108. Thus, as illustrated in FIG. 1B, an electric field generated between the first electrode layer 120 and the second electrode layer 122 can be three-dimensionally spread in the thickness direction of the liquid crystal layer 108 in accordance with the heights (thicknesses) of the first structure body 110 and the second structure body 112 based on the first substrate 100. Accordingly, as compared with the case where the first structure body 110 and the second structure body 112 are not provided, the area to which an electric field is applied can be increased in the thickness direction of the liquid crystal layer 108, and thus white transmittance can be improved to improve contrast ratio.

Furthermore, in the liquid crystal display device described in this embodiment, the third electrode layer 123 is provided on the surface of the second substrate 102 on the liquid crystal layer 108 side so as to overlap at least partly with the second electrode layer 122. Thus, as illustrated in FIG. 1B, an electric field tilted toward the first substrate 100 is generated between the first electrode layer 120 and the third electrode layer 123, in addition to the electric field generated between the first electrode layer 120 and the second electrode layer 122. Here, as illustrated in FIG. 1A, the direction of a planar-direction component of the electric field generated between the first electrode layer 120 and the third electrode layer 123 is the third direction 134. Thus, the electric field which is generated between the first electrode layer 120 and the second electrode layer 122 and is three-dimensionally spread can be further spread three-dimensionally in the thickness direction of the liquid crystal layer 108. Accordingly, as compared with the case where the third electrode layer 123 is not provided, the area to which an electric field is applied can be increased in the thickness direction of the liquid crystal layer 108, and thus white transmittance can be improved to improve contrast ratio.

Moreover, the above electrode structure enables an electric field to be efficiently applied to a wide area of the liquid crystal layer 108; therefore, even in the case where a liquid crystal material exhibiting a blue phase and having high viscosity is used for the liquid crystal layer 108, liquid crystal molecules can be driven with relatively low voltage and the power consumption of the liquid crystal display device can be reduced.

Specific structures of components of the display device of this embodiment are described below.

The first substrate 100 and the second substrate 102 can each be a substrate having a light-transmitting property. For example, a glass substrate or a ceramic substrate can be used. In addition, the first substrate 100 and the second substrate 102 can each be a substrate having a light-transmitting property and flexibility, such as a plastic substrate. As the plastic substrate, a fiberglass-reinforced plastics (FRP) plate, a polyvinyl fluoride (PVF) film, a polyester film, or an acrylic resin film can be used. In addition, a sheet with a structure in which an aluminum foil is interposed between PVF films or polyester films can be used.

There is no particular limitation on the first polarizing plate 104 and the second polarizing plate 106 as long as they can produce linearly polarized light from natural light or circularly polarized light. For example, a polarizing plate whose optical anisotropy is obtained by disposing dichroic substances in one direction can be used. Such a polarizing plate can be formed in such a manner that an iodine-based compound or the like is adsorbed to a film such as a polyvinyl alcohol film and the film is stretched in one direction. Note that, as the dichroic substance, a dye-based compound or the like as well as an iodine-based compound can be used.

As described above, the first polarizing plate 104 and the second polarizing plate 106 are provided for the first substrate 100 and the second substrate 102, respectively, so that the polarization axis of the first polarizing plate 104 is aligned with the first direction 130 and the polarization axis of the second polarizing plate 106 is aligned with the second direction 132 that is orthogonal to the first direction 130. Note that FIG. 1B illustrates an example in which the first polarizing plate 104 and the second polarizing plate 106 are provided on the sides of the first substrate 100 and the second substrate 102 which are opposite to the liquid crystal layer 108, that is, on the outside of the first substrate 100 and the second substrate 102; however, the liquid crystal display device described in this embodiment is not limited to this. For example, the first polarizing plate 104 and the second polarizing plate 106 may be provided on the sides of the first substrate 100 and the second substrate 102 which face the liquid crystal layer 108, that is, on the inside of the first substrate 100 and the second substrate 102.

As illustrated in FIGS. 1A to 1D, the first structure body 110 and the second structure body 112 are provided to project from the surface of the first substrate 100 on the liquid crystal layer 108 side into the liquid crystal layer 108, and the side surfaces of the first structure body 110 and the second structure body 112 are parallel to the first direction or the second direction. In other words, the first structure body 110 and the second structure body 112 are each a columnar structure body having a substantially square-shaped bottom surface. The height (thickness) of each of the first structure body 110 and the second structure body 112 based on the first substrate 100 is preferably 500 nm to 5000 nm.

By forming the first structure body 110 in this manner, the interface between the first structure body 110 and the first electrode layer 120 at the side surface of the first structure body 110 and the interface between the first electrode layer 120 and the liquid crystal layer 108 can be parallel to the first direction 130 or the second direction 132. Accordingly, birefringence caused by differences in the refractive indices of the first structure body 110, the first electrode layer 120, and the liquid crystal layer 108 can be suppressed; thus, light leakage in a pixel where black display is performed can be reduced to improve contrast ratio. Needless to say, the same applies to the relation among the second structure body 112, the second electrode layer 122, and the liquid crystal layer 108. Note that a specific mechanism of suppression of such birefringence and reduction in light leakage in a pixel where black display is performed is described later with reference to FIGS. 3A to 3C.

The first structure body 110 and the second structure body 112 may be formed using a material having a property of transmitting visible light, specifically, an (organic or inorganic) light-transmitting insulating material or an (organic or inorganic) light-transmitting conductive material. Typically, a visible light curable resin, an ultraviolet curable resin, or a thermosetting resin is preferably used. For example, an acrylic resin, polyimide, a benzocyclobutene resin, polyamide, an epoxy resin, or an amine resin can be used. Alternatively, the first structure body 110 and the second structure body 112 may be formed using a light-transmitting conductive resin or the like. Note that the first structure body 110 and the second structure body 112 may each have a stacked-layer structure of plural thin films. In this manner, when the first structure body 110 and the second structure body 112 are formed using a material having a property of transmitting visible light, the aperture ratio of the liquid crystal display device can be improved.

In addition, there is no particular limitation on the method for forming the first structure body 110 and the second structure body 112, and a dry method such as an evaporation method, a sputtering method, or a CVD method or a wet method such as spin coating, dip coating, spray coating, a droplet discharge method (ink-jet method), nanoimprinting, or a variety of printing methods (screen printing or offset printing) may be used depending on the material. As needed, an etching method (dry etching or wet etching) may be employed to form a desired pattern. For example, the first structure body 110 and the second structure body 112 can be formed by performing a photolithography process on a photosensitive organic resin.

Further, the side surfaces of the first structure body 110 and the second structure body 112 may be tilted toward the first substrate 100, that is, may each have a tapered shape. In this manner, when the side surfaces of the first structure body 110 and the second structure body 112 each have a tapered shape, favorable coverage with the first electrode layer 120 and the second electrode layer 122 which are formed to cover the side surfaces of the first structure body 110 and the second structure body 112 can be obtained.

The first structure body 110 and the second structure body 112 may each have either a flat top surface or a conical top. Alternatively, the first structure body 110 and the second structure body 112 may each have a structure in which a curved surface is formed from the top surface to the side surface. When the first structure body 110 and the second structure body 112 each have such a shape in which a curved surface is formed from the top surface to the side surface, favorable coverage with the first electrode layer 120 and the second electrode layer 122 which are formed to cover the top surfaces of the first structure body 110 and the second structure body 112 can be obtained.

Alternatively, an interlayer film may be formed over the first substrate 100 and partly patterned to have shapes similar to those of the top surfaces and side surfaces of the plurality of first structure bodies 110 and the top surfaces and side surfaces of the plurality of second structure bodies 112. In this manner, the plurality of first structure bodies 110 and the plurality of second structure bodies 112 may be a continuous structure body formed using one interlayer film.

As illustrated in FIG. 1A, the plurality of first structure bodies 110 is arranged to be orthogonal to the third direction 134, and the plurality of second structure bodies 112 is arranged to face a row of the plurality of first structure bodies 110 at a given interval and to be orthogonal to the third direction 134. Since the first electrode layer 120 is provided to cover the top surfaces and side surfaces of the plurality of first structure bodies 110 and the second electrode layer 122 is provided to cover the top surfaces and side surfaces of the plurality of second structure bodies 112, the first electrode layer 120 and the second electrode layer 122 are provided to face each other at a given interval and to be orthogonal to the third direction 134. Here, the interval between the first electrode layer 120 and the second electrode layer 122 can be set as appropriate in accordance with the voltage applied to the liquid crystal layer 108.

Further, as illustrated in FIGS. 1B and 1D, the third electrode layer 123 is preferably provided to overlap with the second electrode layer 122 and to be orthogonal to the third direction 134. Note that the third electrode layer 123 and the second electrode layer 122 do not necessarily overlap with each other so that end portions thereof are aligned as illustrated in FIG. 1B; at least part of the third electrode layer 123 overlaps with part of the second electrode layer 122. For example, a central portion of the second electrode layer 122 may overlap with part of the third electrode layer 123; in this case, the end portion of the third electrode layer 123 may be positioned on the outside of the end portion of the second electrode layer 122 or may be positioned on the inside of the end portion of the second electrode layer 122. Here, the interval in the planar direction between the first electrode layer 120 and the third electrode layer 123 can be set as appropriate in accordance with the voltage applied to the liquid crystal layer 108.

The first structure bodies 110, the second structure bodies 112, the first electrode layer 120, the second electrode layer 122, and the third electrode layer 123 are arranged in this manner, whereby electric fields can be generated in parallel to the third direction 134 between the first electrode layer 120 and the second electrode layer 122 and between the first electrode layer 120 and the third electrode layer 123 as illustrated in FIG. 1A. Particularly in the case where the third electrode layer 123 has substantially the same shape as the second electrode layer 122 and the third electrode layer 123 overlaps with the second electrode layer 122 with the end portions thereof aligned, the direction of the electric field generated between the first electrode layer 120 and the second electrode layer 122 and the direction of the electric field generated between the first electrode layer 120 and the third electrode layer 123 can correspond to the third direction 134 more accurately. Accordingly, when an electric field is generated in the liquid crystal layer 108, liquid crystal molecules in the liquid crystal layer are arranged so that their long-axis directions correspond to the third direction 134.

Here, since the third direction 134 is a direction along a line equally dividing the angle formed by the first direction 130 and the second direction 132, vibration of polarized light which has passed through the liquid crystal molecules arranged so that their long-axis directions correspond to the third direction 134 includes a polarization component in the first direction 130 and a polarization component in the second direction 132. Therefore, light which is converted into linearly polarized light by passing through the first polarizing plate 104 having the polarization axis in the first direction 130 is converted, in the liquid crystal layer 108, into circularly polarized light, elliptically polarized light, or linearly polarized light having the polarization component in the first direction 130 and the polarization component in the second direction 132; thus, the light is emitted through the second polarizing plate 106 having the polarization axis in the second direction 132. Conversely, in the case where the direction of an electric field generated in the liquid crystal layer 108 is parallel to the first direction 130 or the second direction 132, light which is converted into linearly polarized light by passing through the first polarizing plate 104 enters the second polarizing plate 106 without changing its polarization property and thus hardly passes through the second polarizing plate 106.

The first structure bodies 110, the second structure bodies 112, the first electrode layer 120, the second electrode layer 122, and the third electrode layer 123 are arranged in the above manner, whereby, when an electric field is applied to the liquid crystal layer 108, that is, when white display is performed in a pixel, the white transmittance of the liquid crystal display device can be improved; thus, the contrast ratio thereof can be improved.

One of the first electrode layer 120 and the second electrode layer 122 functions as a pixel electrode, and the other functions as a common electrode. In this embodiment, the first electrode layer 120 functions as a pixel electrode, and the second electrode layer 122 functions as a common electrode. Therefore, the first electrode layer 120 and the second electrode layer 122 are provided so as not to be in contact with each other. Note that, in drawings of this specification, the first electrode layer 120 is illustrated with a hatching pattern different from that of the second electrode layer 122 so as to be distinguishable, as in FIGS. 1A to 1D. The purpose of this is to make it clear that the electrode layers have different functions, and the first electrode layer 120 can be formed using the same process and material as the second electrode layer 122.

In addition, the third electrode layer 123 functions as a common electrode. In this embodiment, the second electrode layer 122 and the third electrode layer 123 function as common electrodes.

The first electrode layer 120, the second electrode layer 122, and the third electrode layer 123 may be formed using a conductive material having a property of transmitting visible light. For example, indium tin oxide (ITO), a conductive material in which zinc oxide (ZnO) is mixed in indium oxide (indium zinc oxide), a conductive material in which silicon oxide ($SiO_2$) is mixed in indium oxide, organoindium, organotin, or a conductive oxide such as indium oxide containing tungsten oxide, indium zinc oxide containing tungsten oxide, indium oxide containing titanium oxide, or indium tin oxide containing titanium oxide can be used. A metal film having a thickness small enough to transmit light (the thickness is preferably approximately 5 nm to 30 nm) can be used as a light-transmitting conductive film. For example, the first electrode layer 120, the second electrode layer 122, and the third electrode layer 123 can be formed using one or more kinds of materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of any of these metals; and a nitride of any of these metals. By forming the first electrode layer 120, the second electrode layer 122, and the third electrode layer 123 with the use of a conductive material having a property of transmitting visible light, the aperture ratio of the liquid crystal display device can be improved.

In addition, each of the first electrode layer 120 and the second electrode layer 122 preferably has a thickness greater than or equal to 20 nm and less than or equal to 150 nm, further preferably greater than or equal to 20 nm and less than or equal to 50 nm. Such a thickness allows further reduction in birefringence caused at the interface between the first structure body 110 and the first electrode layer 120 or the interface between the first electrode layer 120 and the liquid crystal layer 108 and the interface between the second structure body 112 and the second electrode layer 122 or the interface between the second electrode layer 122 and the liquid crystal layer 108 and further suppression of light leakage at the time of black display. The third electrode layer 123 may also have a thickness greater than or equal to 20 nm and less than or equal to 150 nm.

The first electrode layer 120 preferably has a refractive index as close to that of the first structure body 110 as possible; for example, the ratio of the refractive index of the first electrode layer 120 to that of the first structure body 110 is preferably 0.5 to 1.5. The second electrode layer 122 preferably has a refractive index as close to that of the second structure body 112 as possible; for example, the ratio of the refractive index of the second electrode layer 122 to that of the second structure body 112 is preferably 0.5 to 1.5. Further, the refractive indices of the first electrode layer 120, the first structure body 110, the second electrode layer 122, the second structure body 112, and the liquid crystal layer 108 are preferably as close to each other as possible.

In particular, in the case where a conductive material having a refractive index higher than or equal to 1.6, such as ITO, is used for the first electrode layer 120 and the second electrode layer 122, the first structure body 110 and the second structure body 112 are preferably formed using a material having a refractive index higher than or equal to 1.6, such as a resin in which titanium oxide is dispersed.

In this manner, when the first electrode layer 120, the first structure body 110, the second electrode layer 122, the second structure body 112, and the liquid crystal layer 108 have close refractive indices, birefringence caused at the interface between the first structure body 110 and the first electrode layer 120 or the interface between the first electrode layer 120 and the liquid crystal layer 108 and the interface between the second structure body 112 and the second electrode layer 122 or the interface between the second electrode layer 122 and the liquid crystal layer 108 can be further reduced and light leakage at the time of black display can be further suppressed.

In addition, since the first electrode layer 120 and the second electrode layer 122 are provided to face each other at a given interval as described above, an opening pattern is formed between the first electrode layer 120 and the second electrode layer 122. Most light emitted at the time of white display is obtained through the opening pattern.

The first electrode layer 120 and the second electrode layer 122 in a pixel region of the liquid crystal display device preferably have the following planar shapes: each of the first electrode layer 120 and the second electrode layer 122 does not have a closed space and is opened so that the area of a portion where the first electrode layer 120 and the second electrode layer 122 face each other is large, and the first electrode layer 120 and the second electrode layer 122 engage with each other. At this time, it is preferable that the third electrode layer 123 also have a planar shape in which the third electrode layer 123 does not have a closed space and is opened so that the area of a portion where the first electrode layer 120 and the third electrode layer 123 face each other is large, and it is preferable that the first electrode layer 120 and the third electrode layer 123 engage with each other. In other words, the third electrode layer 123 has substantially the same planar shape as the second electrode layer 122. For example, the first electrode layer 120 and the second electrode layer 122 may have, as planar shapes, comb-like patterns which engage with each other, and the third electrode layer 123 may have substantially the same planar shape as the second electrode layer 122.

The direction of an electric field generated in the liquid crystal layer 108, that is, the third direction 134 is parallel to dashed line A-B in FIG. 1A; however, the liquid crystal display device of one embodiment of the present invention is not limited to this. In the case where the third direction 134 is a direction orthogonal to dashed line A-B, the third direction 134 can also equally divide the angle formed by the first direction 130 and the second direction 132. In short, the third direction 134 can be two directions orthogonal to each other. Therefore, in the case where the comb-like patterns which engage with each other are employed as the planar shapes of the first electrode layer 120 and the second electrode layer 122 and the planar shapes of the first electrode layer 120 and the third electrode layer 123, the comb-like pattern can include not only a linear pattern but also a shape with a bending portion or a branching portion.

Note that, in FIGS. 1A and 1B, the first electrode layer 120, the second electrode layer 122, and the third electrode layer 123 extend in the direction orthogonal to the third direction 134 and the first electrode layer 120 is interposed between two second electrode layers 122; however, the liquid crystal display device of one embodiment of the present invention is not limited to this. For example, the first electrode layer 120 and the second electrode layer 122 can have comb-like patterns which engage with each other, and the first electrode layer 120 and the third electrode layer 123 can have comb-like patterns which engage with each other.

Needless to say, the plurality of first structure bodies 110 and the plurality of second structure bodies 112 are provided in accordance with the planar shapes of the first electrode layer 120 and the second electrode layer 122.

Note that the arrangement of the first structure bodies and the second structure bodies is not limited to the arrangement illustrated in FIG. 1A. Examples of the arrangement of the first structure bodies and the second structure bodies are described below with reference to FIGS. 4A to 4C and FIGS. 5A and 5B, which are plan views of liquid crystal display devices of embodiments of this embodiment. Note that the first electrode layer 120 and the second electrode layer 122 are illustrated with dashed lines in FIGS. 4A to 4C and FIGS. 5A and 5B for easy understanding.

In this embodiment, the first structure bodies 110 are arranged along the first electrode layer 120 to be adjacent to one another, and the second structure bodies 112 are arranged along the second electrode layer 122 to be adjacent to one another as illustrated in FIGS. 1A, 1C, and 1D; however, the liquid crystal display device of one embodiment of the present invention is not limited to this. The interval between the arranged first structure bodies 110 and the interval between the arranged second structure bodies 112 can be set as appropriate. For example, as illustrated in FIG. 4A, the first structure bodies 110 and the second structure bodies 112 can each be arranged to be spaced.

Alternatively, as illustrated in FIG. 4B, a first structure body 180 having a shape in which end portions of the first structure bodies 110 illustrated in FIG. 1A are connected and a second structure body 182 having a shape in which end portions of the second structure bodies 112 illustrated in FIG. 1A are connected may be provided.

Alternatively, as illustrated in FIG. 4C, a first structure body 190 having a shape in which corner portions of the bottom surfaces of the first structure bodies 110 illustrated in FIG. 1A and corner portions formed between the top surfaces and bottom surfaces of the first structure bodies 110 are chamfered in a circular arc shape and end portions of the first structure bodies 110 are connected, and a second structure body 192 having a shape in which corner portions of the bottom surfaces of the second structure bodies 112 illustrated in FIG. 1A and corner portions formed between the top surfaces and bottom surfaces of the second structure bodies 112 are chamfered in a circular arc shape and end portions of the second structure bodies 112 are connected may be provided.

In particular, in the case of being formed by photolithography with the use of a photosensitive organic substance such as a visible light curable resin or an ultraviolet curable resin, the first structure body and the second structure body can each easily have a shape in which a corner portion is chamfered in a circular arc shape. It is to be noted that, when the chamfer portion is too large, light leakage might be caused in a pixel where black display is performed.

In this embodiment, the plurality of first structure bodies 110 has a uniform size and the plurality of second structure bodies 112 has a uniform size as illustrated in FIGS. 1A, 1C, and 1D; however, the liquid crystal display device of one embodiment of the present invention is not limited to this. The plurality of first structure bodies 110 may vary in size, and the plurality of second structure bodies 112 may vary in size. For example, a structure illustrated in FIG. 5A may be employed in which a first structure body 110a and a first structure body 110b that is smaller than the first structure body 110a are alternately arranged and a second structure body 112a and a second structure body 112b that is smaller than the second structure body 112a are alternately arranged.

Figure 5A:
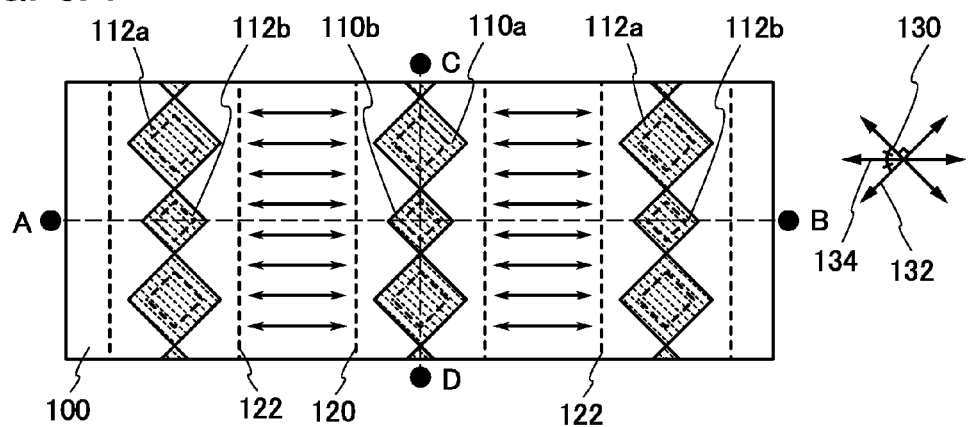
FIGS. 5A and 5B are each a plan view which illustrates a liquid crystal display device of one embodiment of the present invention.
Figure 5B:
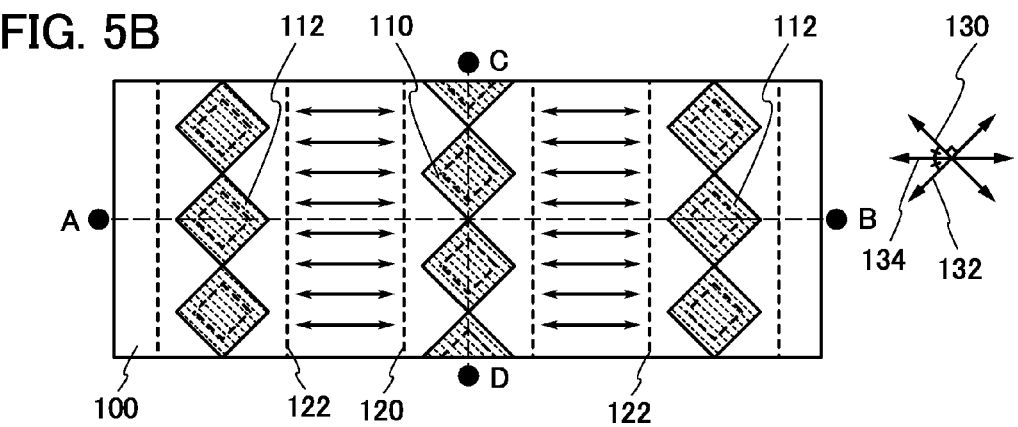

In this embodiment, as illustrated in FIGS. 1A and 1B, the first structure bodies 110 and the second structure bodies 112 are provided to be symmetric about a straight line connecting midpoints between the first electrode layer 120 and the second electrode layer 122; however, the liquid crystal display device of one embodiment of the present invention is not limited to this. For example, as illustrated in FIG. 5B, a row of the first structure bodies 110 may be slid from a row of the second structure bodies 112 by a half size of one structure body in the vertical direction in the drawing, with respect to the straight line connecting the midpoints between the first electrode layer 120 and the second electrode layer 122.

In addition, the liquid crystal layer 108 is formed using a liquid crystal material that can be used in a horizontal electric field mode, preferably a liquid crystal material exhibiting a blue phase. The liquid crystal material exhibiting a blue phase has a short response time of 1 millisecond or less and is capable of high-speed response. Thus, higher performance of the liquid crystal display device can be achieved.

For example, the liquid crystal material exhibiting a blue phase, which is capable of high-speed response, can be favorably used for a successive additive color mixing method (field sequential method) in which light-emitting diodes (LEDs) of RGB or the like are arranged in a backlight unit and color display is performed by time division, or a three-dimensional display method in which images for the right eye and images for the left eye are alternately displayed by time division.

The liquid crystal material exhibiting a blue phase contains a liquid crystal and a chiral agent. The chiral agent is used to align the liquid crystal in a helical structure and to make the liquid crystal exhibit a blue phase. For example, a liquid crystal material into which a chiral agent is mixed at 5 wt % or more may be used for the liquid crystal layer.

As the liquid crystal, a thermotropic liquid crystal, a low molecular liquid crystal, a high molecular liquid crystal, a ferroelectric liquid crystal, an anti-ferroelectric liquid crystal, or the like is used.

As the chiral agent, a material having a high compatibility with a liquid crystal and a strong twisting power is used. Either one of two enantiomers, R and S, is used, and a racemic mixture in which R and S are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. Having the order of less than or equal to a wavelength of visible light, the liquid crystal material is transparent, and optical modulation action occurs through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, in order to expand the temperature range, it is preferable that a photocurable resin and a photopolymerization initiator be added to a liquid crystal material and polymer stabilization treatment be performed. The polymer stabilization treatment is performed in such a manner that a liquid crystal material containing a liquid crystal, a chiral agent, a photocurable resin, and a photopolymerization initiator is irradiated with light having a wavelength with which the photocurable resin and the photopolymerization initiator are reacted. This polymer stabilization treatment may be performed by irradiating a liquid crystal material exhibiting an isotropic phase with light or by irradiating a liquid crystal material exhibiting a blue phase with light under the control of temperature.

For example, the polymer stabilization treatment is performed in the following manner: the temperature of a liquid crystal layer is controlled and the liquid crystal layer exhibiting a blue phase is irradiated with light. However, the polymer stabilization treatment is not limited to this manner and may be performed in such a manner that a liquid crystal layer exhibiting an isotropic phase at a temperature within +10° C., preferably +5° C., from the phase transition temperature between the blue phase and the isotropic phase is irradiated with light. The phase transition temperature between the blue phase and the isotropic phase is a temperature at which the phase changes from the blue phase to the isotropic phase when the temperature is raised, or a temperature at which the phase changes from the isotropic phase to the blue phase when the temperature is lowered. As an example of the polymer stabilization treatment, the following method can be employed: after heating a liquid crystal layer to exhibit an isotropic phase, the temperature of the liquid crystal layer is gradually lowered so that the phase changes to a blue phase, and then light irradiation is performed while the temperature at which the blue phase is exhibited is kept. Alternatively, after the phase changes to the isotropic phase by gradually heating a liquid crystal layer, the liquid crystal layer can be irradiated with light at a temperature within +10° C., preferably +5° C., from the phase transition temperature between the blue phase and the isotropic phase (in the state where an isotropic phase is exhibited). In the case of using an ultraviolet curable resin (UV curable resin) as the photocurable resin contained in the liquid crystal material, the liquid crystal layer may be irradiated with ultraviolet rays. Even in the case where the blue phase is not exhibited, if polymer stabilization treatment is performed by light irradiation at a temperature within +10° C., preferably +5° C., from the phase transition temperature between the blue phase and the isotropic phase (in the state where an isotropic phase is exhibited), the response time can be made as short as 1 millisecond or less and high-speed response is possible.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin which is cured with light having a wavelength with which the photopolymerization initiator used is reacted is selected as the photocurable resin, and an ultraviolet curable resin can be typically used.

As the photopolymerization initiator, a radical polymerization initiator which generates a radical by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl can be used as the liquid crystal material. As the chiral agent, ZLI-4572 (produced by Merck Ltd., Japan) can be used. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

Although not illustrated in FIGS. 1A to 1D, an optical film or the like, such as a retardation plate or an anti-reflection film, can be provided as appropriate. A coloring layer which functions as a color filter layer can be further provided. In addition, a backlight or the like can be used as a light source. Further, an element layer for driving the liquid crystal display device can be provided as appropriate between the first substrate 100 and the liquid crystal layer 108.

Next, a mechanism of reduction in light leakage in a pixel where black display is performed in the liquid crystal display device of one embodiment of the present invention is described with reference to FIGS. 1A to 1D, FIGS. 2A to 2C, and FIGS. 3A to 3C.

Figure 2A:
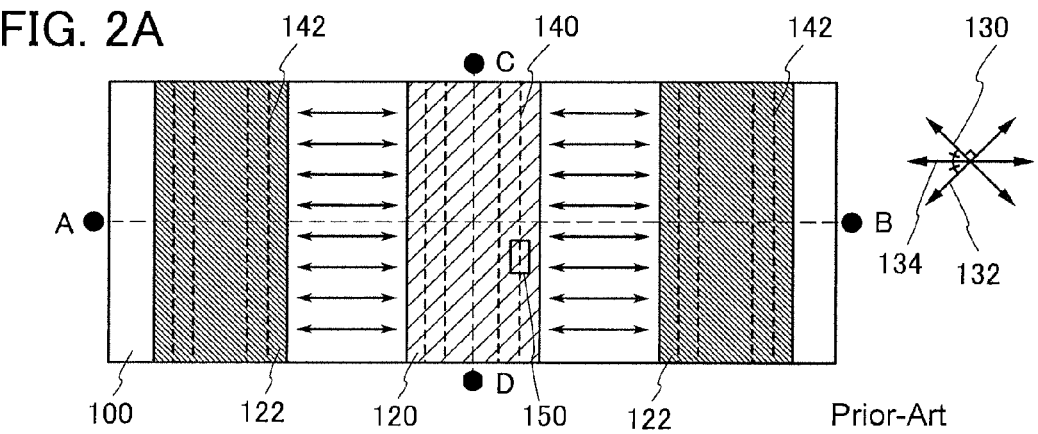
FIGS. 2A to 2C a plan view and cross-sectional views which illustrate an example of a conventional liquid crystal display device.
Figure 2B:
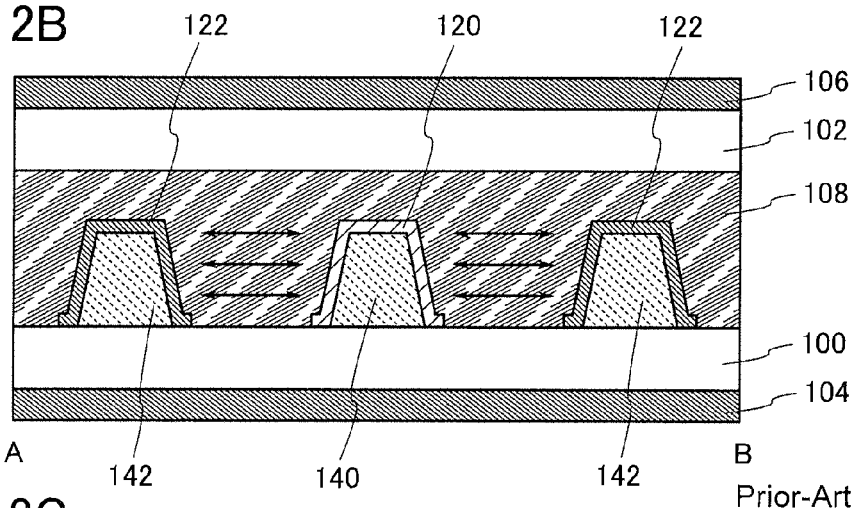
Figure 2C:
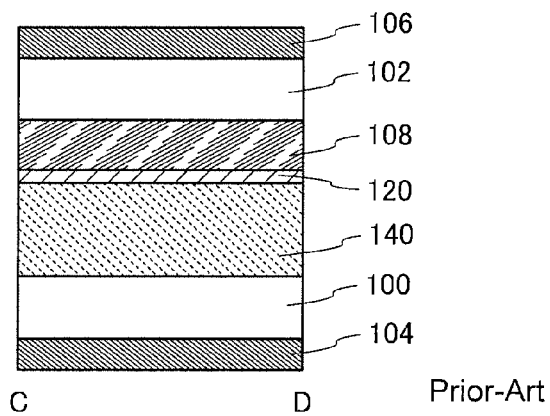

First, a structure of a conventional liquid crystal display device as disclosed in Patent Document 2 is described with reference to FIGS. 2A to 2C. FIG. 2A is a plan view of an example of a conventional liquid crystal display device, and FIGS. 2B and 2C are cross-sectional views of the example of the conventional liquid crystal display device. Here, the cross-sectional view of FIG. 2B is taken along dashed line A-B in FIG. 2A, and the cross-sectional view of FIG. 2C is taken along dashed line C-D in FIG. 2A.

The example of the conventional liquid crystal display device illustrated in FIGS. 2A to 2C is the same as the liquid crystal display device illustrated in FIGS. 1A to 1D in that the first substrate 100, the second substrate 102, the first polarizing plate 104, the second polarizing plate 106, the liquid crystal layer 108, the first electrode layer 120, and the second electrode layer 122 are provided. The liquid crystal display device illustrated in FIGS. 2A to 2C is largely different from the liquid crystal display device illustrated in FIGS. 1A to 1D in that a first structure body 140 whose top surface and side surface are covered with the first electrode layer 120 and a second structure body 142 whose top surface and side surface are covered with the second electrode layer 122 are provided. Unlike the plurality of first structure bodies 110 and the plurality of second structure bodies 112 illustrated in FIGS. 1A to 1D, the first structure body 140 and the second structure body 142 have rib-like shapes based on the shapes of the first electrode layer 120 and the second electrode layer 122 which extend orthogonally to the third direction 134.

In the liquid crystal display device in FIGS. 1A to 1D of one embodiment of the present invention, the side surfaces of the plurality of first structure bodies 110 and the plurality of second structure bodies 112 are parallel to the first direction 130 or the second direction 132, whereas, in the example of the conventional liquid crystal display device in FIGS. 2A to 2C, the side surfaces of the first structure body 140 and the second structure body 142 are orthogonal to the third direction 134.

That is, in the example of the conventional liquid crystal display device in FIGS. 2A to 2C, an interface between the side surface of the first structure body 140 and the first electrode layer 120 or an interface between the first electrode layer 120 and the liquid crystal layer 108 and an interface between the side surface of the second structure body 142 and the second electrode layer 122 or an interface between the second electrode layer 122 and the liquid crystal layer 108 are orthogonal to the third direction 134.

Here, as for the example of the conventional liquid crystal display device in FIGS. 2A to 2C, a mechanism of light leakage caused at the time of black display in a region 150 which includes the interface between the side surface of the first structure body 140 and the first electrode layer 120 and the interface between the first electrode layer 120 and the liquid crystal layer 108 is described with reference to FIG. 3A.

FIG. 3A is a schematic view illustrating a manner in which, when black display is performed in the example of the conventional liquid crystal display device in FIGS. 2A to 2C, light entering from a first polarizing plate 104 side is transmitted through the region 150 and further through the second polarizing plate 106, so that light leakage is caused. A process in which incident light 160 enters the first polarizing plate 104 and emission light 166 leaks through the second polarizing plate 106 is described below.

First, the incident light 160 enters the first polarizing plate 104 having the polarization axis in the first direction 130. The incident light 160 is visible light having both the polarization component in the first direction 130 and the polarization component in the second direction 132. The polarization component in the second direction 132 of the incident light 160 which has entered the first polarizing plate 104 is absorbed, and the incident light 160 is converted into linearly polarized light (first polarized light 162) vibrating in the first direction 130.

Next, the first polarized light 162 enters the region 150. Here, it is assumed that the first polarized light 162 is divided into a component (interface-parallel component 162a) which is parallel to the interface between the side surface of the first structure body 140 and the first electrode layer 120 or the interface between the first electrode layer 120 and the liquid crystal layer 108 and a component (interface-perpendicular component 162b) which is perpendicular to the interface.

Then, the interface-parallel component 162a of the first polarized light 162 passes through the region 150 without crossing the interface between the side surface of the first structure body 140 and the first electrode layer 120 or the interface between the first electrode layer 120 and the liquid crystal layer 108, while the interface-perpendicular component 162b passes through the region 150 across the interface.

Here, the first electrode layer 120 has a sufficiently small thickness with respect to wavelengths of visible light, and thus the interface-parallel component 162a and the interface-perpendicular component 162b are affected by different refractive indices because of differences in the refractive indices of the first structure body 140, the first electrode layer 120, and the liquid crystal layer 108. In short, birefringence is caused in the first polarized light 162 having the interface-parallel component 162a and the interface-perpendicular component 162b. Accordingly, a difference is made between the speed of the interface-perpendicular component 162b and the speed of the interface-parallel component 162a, so that a phase difference is caused between the interface-perpendicular component 162b and the interface-parallel component 162a.

In this manner, the phase difference is caused between the interface-parallel component 162a and the interface-perpendicular component 162b by passing through the region 150, so that the first polarized light 162 is converted into second polarized light 164. The second polarized light 164 is circularly polarized light or elliptically polarized light attributed to the phase difference between the interface-parallel component 162a and the interface-perpendicular component 162b. Therefore, the second polarized light 164 has both the polarization component in the first direction 130 and the polarization component in the second direction 132.

Finally, the second polarized light 164 enters the second polarizing plate 106. The polarization component in the first direction 130 of the second polarized light 164 is absorbed by the second polarizing plate 106. However, since the polarization component in the second direction 132 of the second polarized light 164 is a component parallel to the polarization axis of the second polarizing plate 106, the polarization component in the second direction 132 passes through the second polarizing plate 106. The emission light 166 which is emitted through the second polarizing plate 106 in this manner is observed as light leakage at the time of black display.

In the above manner, when black display is performed in the example of the conventional liquid crystal display device in FIGS. 2A to 2C, light leakage is caused in the region 150, that is, a region where the interface between the side surface of the first structure body 140 and the first electrode layer 120 or the interface between the first electrode layer 120 and the liquid crystal layer 108 is perpendicular to the third direction 134. Note that the region 150 includes the interface between the side surface of the first structure body 140 and the first electrode layer 120 or the interface between the first electrode layer 120 and the liquid crystal layer 108; needless to say, the above discussion also applies to a region which includes the interface between the side surface of the second structure body 142 and the second electrode layer 122 or the interface between the second electrode layer 122 and the liquid crystal layer 108 in the example of the conventional liquid crystal display device in FIGS. 2A to 2C.

By contrast, the liquid crystal display device in FIGS. 1A to 1D of one embodiment of the present invention includes a region 152 where the interface between the side surface of the first structure body 110 and the first electrode layer 120 or the interface between the first electrode layer 120 and the liquid crystal layer 108 is parallel to the first direction 130 and a region 154 where the interface is parallel to the second direction 132.

As for the liquid crystal display device in FIGS. 1A to 1D of one embodiment of the present invention, which has such a structure, a mechanism of reduction in light leakage caused at the time of black display in the region 152 and the region 154 is described with reference to FIGS. 3B and 3C.

FIG. 3B is a schematic view illustrating a manner in which, when black display is performed in the liquid crystal display device in FIGS. 1A to 1D of one embodiment of the present invention, light entering from the first polarizing plate 104 side is transmitted through the region 152 and is absorbed by the second polarizing plate 106. A process in which the incident light 160 enters the first polarizing plate 104 and is absorbed by the second polarizing plate 106 is described below.

As in FIG. 3A, the incident light 160 is converted by the first polarizing plate 104 into the first polarized light 162 which is linearly polarized light.

Next, the first polarized light 162 enters the region 152. Here, the first polarized light 162 is affected by differences in the refractive indices of the first structure body 110, the first electrode layer 120, and the liquid crystal layer 108. However, the first polarized light 162 is linearly polarized light which is parallel to the interface between the side surface of the first structure body 110 and the first electrode layer 120 or the interface between the first electrode layer 120 and the liquid crystal layer 108 and does not have a polarization component which is perpendicular to the interfaces; therefore, a phase difference between a component which is perpendicular to the interfaces and a component which is parallel to the interfaces is not caused. Thus, second polarized light 170 which has passed through the region 152 is linearly polarized light like the first polarized light 162.

Finally, the second polarized light 170 enters the second polarizing plate 106. The second polarized light 170 is linearly polarized light having the polarization component in the first direction 130 and thus is absorbed by the second polarizing plate 106. Consequently, light is not emitted through the second polarizing plate 106 and thus light leakage is not observed at the time of black display.

FIG. 3C is a schematic view illustrating a manner in which, when black display is performed in the liquid crystal display device in FIGS. 1A to 1D of one embodiment of the present invention, light entering from the first polarizing plate 104 side is transmitted through the region 154 and is absorbed by the second polarizing plate 106. A process in which the incident light 160 enters the first polarizing plate 104 and is absorbed by the second polarizing plate 106 is described below.

As in FIG. 3A, the incident light 160 is converted by the first polarizing plate 104 into the first polarized light 162 which is linearly polarized light.

Next, the first polarized light 162 enters the region 154. Here, the first polarized light 162 is affected by differences in the refractive indices of the first structure body 110, the first electrode layer 120, and the liquid crystal layer 108. However, the first polarized light 162 is linearly polarized light which is perpendicular to the interface between the side surface of the first structure body 110 and the first electrode layer 120 or the interface between the first electrode layer 120 and the liquid crystal layer 108 and does not have a polarization component which is parallel to the interfaces; therefore, a phase difference between a component which is perpendicular to the interfaces and a component which is parallel to the interfaces is not caused. Thus, second polarized light 172 which has passed through the region 154 is linearly polarized light like the first polarized light 162.

Finally, the second polarized light 172 enters the second polarizing plate 106. The second polarized light 172 is linearly polarized light having the polarization component in the first direction 130 and thus is absorbed by the second polarizing plate 106. Consequently, light is not emitted through the second polarizing plate 106 and thus light leakage is not observed at the time of black display.

In the above manner, when black display is performed in the liquid crystal display device in FIGS. 1A to 1D of one embodiment of the present invention, light leakage can be reduced in the region 152 and the region 154, that is, regions where the interface between the side surface of the first structure body 110 and the first electrode layer 120 or the interface between the first electrode layer 120 and the liquid crystal layer 108 is parallel to the first direction 130 or the second direction 132. Note that the region 152 or the region 154 is the region where the interface between the side surface of the first structure body 110 and the first electrode layer 120 or the interface between the first electrode layer 120 and the liquid crystal layer 108 is parallel to the first direction 130 or the second direction 132; needless to say, the above discussion also applies to a region where the interface between the side surface of the second structure body 112 and the second electrode layer 122 or the interface between the second electrode layer 122 and the liquid crystal layer 108 is parallel to the first direction 130 or the second direction 132 in the liquid crystal display device in FIGS. 1A to 1D of one embodiment of the present invention.

In the above manner, it is possible to provide a liquid crystal display device using a horizontal electric field mode, particularly a liquid crystal display device using a liquid crystal exhibiting a blue phase, in which light leakage in a pixel where black display is performed is reduced to improve contrast ratio. It is also possible to provide a liquid crystal display device using a horizontal electric field mode, particularly a liquid crystal display device using a liquid crystal exhibiting a blue phase, in which the transmittance in a pixel where white display is performed is improved to improve contrast ratio.

The structures and the like described in this embodiment can be combined as appropriate with any of the structures and the like described in the other embodiments.

Embodiment 2

In this embodiment, a display device having a mode different from that of the liquid crystal display device described in Embodiment 1 is described with reference to FIGS. 6A to 6D. A structure with which, in the case where a first structure body and a second structure body like those in FIG. 4C in the above embodiment are provided, light leakage can be suppressed more effectively in a pixel where black display is performed is described.

First, a liquid crystal display device of one embodiment of the present invention is described with reference to FIGS. 6A to 6D. FIG. 6A is a plan view of the liquid crystal display device of one embodiment of the present invention, and FIGS. 6B to 6D are cross-sectional views of the liquid crystal display device of one embodiment of the present invention. Here, the cross-sectional view of FIG. 6B is taken along dashed line A-B in FIG. 6A, the cross-sectional view of FIG. 6C is taken along dashed line C-D in FIG. 6A, and the cross-sectional view of FIG. 6D is taken along dashed line E-F in FIG. 6A. Note that a third electrode layer 223 which overlaps with a second electrode layer 222, and the like are not illustrated in FIG. 6A for easy understanding of the drawing.

As in the case of the liquid crystal display device illustrated in FIGS. 1A to 1D, the liquid crystal display device illustrated in FIGS. 6A to 6D includes a first polarizing plate 204 provided for a first substrate 200, a second polarizing plate 206 provided for a second substrate 202, a first structure body 210 provided to project from a surface of the first substrate 200 on a liquid crystal layer 208 side into the liquid crystal layer 208, a second structure body 212 provided to project from the surface of the first substrate 200 on the liquid crystal layer 208 side into the liquid crystal layer 208, a first electrode layer 220 covering a top surface and part of a side surface of the first structure body 210, the second electrode layer 222 covering a top surface and part of a side surface of the second structure body 212, the third electrode layer 223 provided on a surface of the second substrate 202 on a liquid crystal layer 208 side so as to overlap at least partly with the second electrode layer 222, and the liquid crystal layer 208 provided between the first substrate 200 and the second substrate 202 and in contact with the first electrode layer 220 and the second electrode layer 222. Here, the first polarizing plate 204 has a polarization axis in a first direction 230 in FIG. 6A, and the second polarizing plate 206 has a polarization axis in a second direction 232 in FIG. 6A that is orthogonal to the first direction 230.

In the liquid crystal display device illustrated in FIGS. 6A to 6D, as in the liquid crystal display device illustrated in FIGS. 1A to 1D, an interface between the side surface of the first structure body 210 and the first electrode layer 220 and an interface between the side surface of the second structure body 212 and the second electrode layer 222 are parallel to the first direction 230 or the second direction 232 in FIG. 6A. The first electrode layer 220 and the second electrode layer 222 are provided so that the direction of an electric field generated in the liquid crystal layer 208 between the first electrode layer 220 and the second electrode layer 222 is a third direction 234 that equally divides an angle formed by the first direction 230 and the second direction 232 as illustrated in FIG. 6A. The first electrode layer 220 and the third electrode layer 223 are provided so that the direction of a planar-direction component of an electric field generated in the liquid crystal layer 208 between the first electrode layer 220 and the third electrode layer 223 is the third direction 234 that equally divides the angle formed by the first direction 230 and the second direction 232 as illustrated in FIG. 6A.

The liquid crystal display device described in this embodiment is different from the liquid crystal display device illustrated in FIGS. 1A to 1D in that a corner portion of a bottom surface of the first structure body 210 and a corner portion formed between the top surface and bottom surface of the first structure body 210 are chamfered in a circular arc shape and the first electrode layer 220 is provided so that the chamfered portions of the first structure body 210 are partly exposed. In addition, the first structure body 210 has a shape in which a plurality of structure bodies shaped like the first structure body 110 is connected at their end portions in a row. The width of the first electrode layer 220 in the third direction is smaller than the width of the first structure body 210 in the third direction. Note that the second structure body 212 and the second electrode layer 222 as well as the first structure body 210 and the first electrode layer 220 have a structure different from that of the liquid crystal display device illustrated in FIGS. 1A to 1D.

As described above, in the liquid crystal display device described in this embodiment, the portions where the side surfaces of the first structure body 210 and the second structure body 212 are chamfered in a circular arc shape are exposed, and the first electrode layer 220 and the second electrode layer 222 are not formed over the portions.

This is for the following reason: the portions where the side surfaces of the first structure body 210 and the second structure body 212 are chamfered in a circular arc shape, like a region 250 in FIG. 6A, are parallel to neither the first direction 230 nor the second direction 232; therefore, if the first electrode layer or the second electrode layer is provided over the portion, light leakage might be caused in a pixel where black display is performed by the mechanism shown in FIG. 3A.

Thus, the portions where the side surfaces of the first structure body 210 and the second structure body 212 are chamfered in a circular arc shape are exposed as in this embodiment, so that an interface between the first electrode layer 220 and the first structure body 210 or an interface between the first electrode layer 220 and the liquid crystal layer 208 is not formed at the exposed side surfaces; accordingly, birefringence caused by the mechanism shown in FIG. 3A does not occur, and thus light leakage in a pixel where black display is performed can be prevented.

Note that, except for the above differences, the first structure body 210 corresponds to the first structure bodies 110, the second structure body 212 corresponds to the second structure bodies 112, the first electrode layer 220 corresponds to the first electrode layer 120, and the second electrode layer 222 corresponds to the second electrode layer 122; therefore, the description in the above embodiment can be referred to for the details. The other components are also similar to those in the liquid crystal display device in FIGS. 1A to 1D, and the first substrate 200 corresponds to the first substrate 100, the second substrate 202 corresponds to the second substrate 102, the first polarizing plate 204 corresponds to the first polarizing plate 104, the second polarizing plate 206 corresponds to the second polarizing plate 106, the liquid crystal layer 208 corresponds to the liquid crystal layer 108, and the third electrode layer 223 corresponds to the third electrode layer 123; therefore, the description in the above embodiment can be referred to for the details. In addition, the first direction 230 is similar to the first direction 130, the second direction 232 is similar to the second direction 132, and the third direction 234 is similar to the third direction 134.

Such a structure is employed in a liquid crystal display device using a horizontal electric field mode, particularly a liquid crystal display device using a liquid crystal exhibiting a blue phase, whereby light leakage in a pixel where black display is performed can be reduced more certainly to improve contrast ratio.

The structures and the like described in this embodiment can be combined as appropriate with any of the structures and the like described in the other embodiments.

Embodiment 3

In this embodiment, a display device having a mode different from that of the liquid crystal display device described in Embodiment 1 is described with reference to FIGS. 7A to 7D. The following structure is described: unlike in the liquid crystal display device described in Embodiment 1, a counter substrate is provided with a plurality of third structure bodies, and a third electrode layer functioning as a common electrode layer and covering bottom surfaces and side surfaces of the third structure bodies is provided.

Figure 7A:
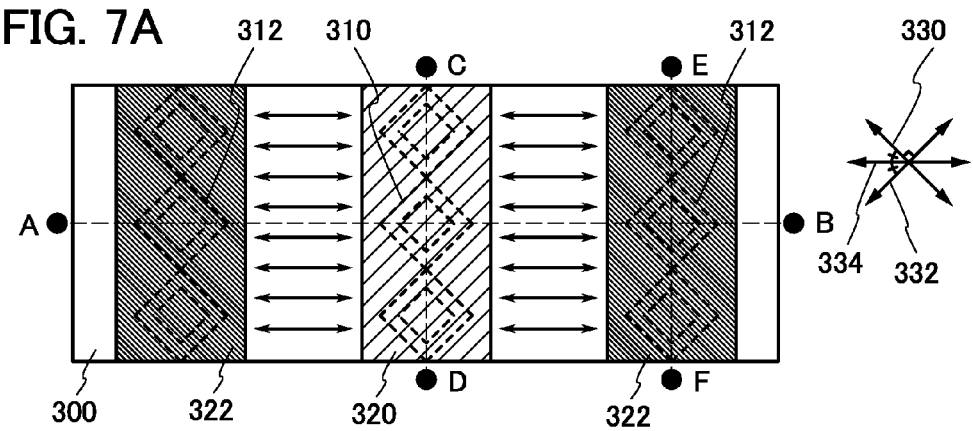
FIGS. 7A to 7D are a plan view and cross-sectional views which illustrate a liquid crystal display device of one embodiment of the present invention.
Figure 7B:
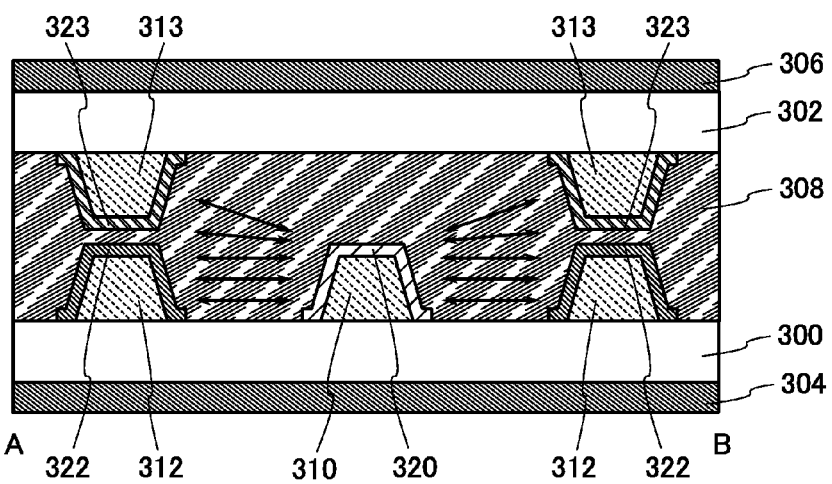
Figure 7C:
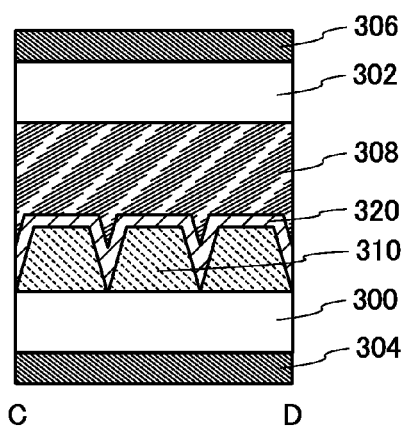
Figure 7D:
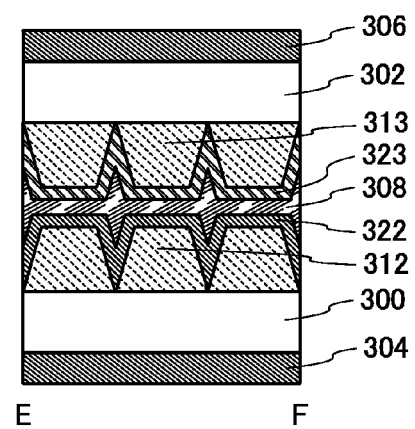

A liquid crystal display device of one embodiment of the present invention is described with reference to FIGS. 7A to 7D. FIG. 7A is a plan view of the liquid crystal display device of one embodiment of the present invention, and FIGS. 7B to 7D are cross-sectional views of the liquid crystal display device of one embodiment of the present invention. Here, the cross-sectional view of FIG. 7B is taken along dashed line A-B in FIG. 7A, the cross-sectional view of FIG. 7C is taken along dashed line C-D in FIG. 7A, and the cross-sectional view of FIG. 7D is taken along dashed line E-F in FIG. 7A. Note that a third electrode layer 323 which overlaps with a second electrode layer 322, third structure bodies 313 which overlap with second structure bodies 312, and the like are not illustrated in FIG. 7A for easy understanding of the drawing.

As in the case of the liquid crystal display device illustrated in FIGS. 1A to 1D, the liquid crystal display device illustrated in FIGS. 7A to 7D includes a first polarizing plate 304 provided for a first substrate 300, a second polarizing plate 306 provided for a second substrate 302, first structure bodies 310 provided to project from a surface of the first substrate 300 on a liquid crystal layer 308 side into the liquid crystal layer 308, the second structure bodies 312 provided to project from the surface of the first substrate 300 on the liquid crystal layer 308 side into the liquid crystal layer 308, the third structure body 313 provided to project from a surface of the second substrate 302 on a liquid crystal layer 308 side into the liquid crystal layer 308 and to overlap at least partly with the second structure bodies 312, a first electrode layer 320 covering top surfaces and side surfaces of the first structure bodies 310, the second electrode layer 322 covering top surfaces and side surfaces of the second structure bodies 312, the third electrode layer 323 covering bottom surfaces and side surfaces of the third structure bodies 313, and the liquid crystal layer 308 provided between the first substrate 300 and the second substrate 302 and in contact with the first electrode layer 320, the second electrode layer 322 and the third electrode layer 323. Here, the first polarizing plate 304 has a polarization axis in a first direction 330 in FIG. 7A, and the second polarizing plate 306 has a polarization axis in a second direction 332 in FIG. 7A that is orthogonal to the first direction 330.

In the liquid crystal display device illustrated in FIGS. 7A to 7D, as in the liquid crystal display device illustrated in FIGS. 1A to 1D, an interface between the side surface of the first structure body 310 and the first electrode layer 320, an interface between the side surface of the second structure body 312 and the second electrode layer 322, and an interface between the side surface of the third structure body 313 and the third electrode layer 323 are parallel to the first direction 330 or the second direction 332 in FIG. 7A. The first electrode layer 320 and the second electrode layer 322 are provided so that the direction of an electric field generated in the liquid crystal layer 308 between the first electrode layer 320 and the second electrode layer 322 is a third direction 334 that equally divides an angle formed by the first direction 330 and the second direction 332 as illustrated in FIG. 7A. The first electrode layer 320 and the third electrode layer 323 are provided so that the direction of a planar-direction component of an electric field generated in the liquid crystal layer 308 between the first electrode layer 320 and the third electrode layer 323 is the third direction 334 that equally divides the angle formed by the first direction 330 and the second direction 332 as illustrated in FIG. 7A.

The liquid crystal display device illustrated in FIGS. 7A to 7D is different from the liquid crystal display device illustrated in FIGS. 1A to 1D in that the plurality of third structure bodies 313 is provided to project from the surface of the second substrate 302 on the liquid crystal layer 308 side into the liquid crystal layer 308 and the third electrode layer 323 is provided to cover the bottom surfaces and side surfaces of the plurality of third structure bodies 313.

As illustrated in FIGS. 7B and 7D, it is preferable that the third structure bodies 313 be provided to overlap with the second structure bodies 312 and to be orthogonal to the third direction 334. Note that the third structure body 313 and the second structure body 312 do not necessarily overlap with each other so that end portions thereof are aligned as illustrated in FIG. 7B; at least part of the third structure body 313 overlaps with part of the second structure body 312. For example, a central portion of the second structure body 312 may overlap with part of the third structure body 313; in this case, the end portion of the third structure body 313 may be positioned on the outside of the end portion of the second structure body 312 or may be positioned on the inside of the end portion of the second structure body 312.

Note that the third structure bodies 313 can have a structure similar to that of the first structure bodies 110 or the second structure bodies 112 described in the above embodiment; therefore, the description of the first structure bodies 110 or the second structure bodies 112 in the above embodiment can be referred to for the details such as a shape, a material, and a formation method of the third structure bodies 313.

In this manner, the plurality of third structure bodies 313 is provided to project from the surface of the second substrate 302 on the liquid crystal layer 308 side into the liquid crystal layer 308, and the third electrode layer 323 is provided to cover the bottom surfaces and side surfaces of the plurality of third structure bodies 313. Consequently, the distance between the first electrode layer 320 and the third electrode layer 323 can be shortened as illustrated in FIG. 7B, so that an electric field generated between the electrode layers can be enhanced. Here, as illustrated in FIG. 7A, the direction of the planar-direction component of the electric field generated between the first electrode layer 320 and the third electrode layer 323 is the third direction 334. Thus, the electric field which is generated between the first electrode layer 320 and the second electrode layer 322 and is three-dimensionally spread can be further spread three-dimensionally in the thickness direction of the liquid crystal layer 308. Accordingly, as compared with the case where the third electrode layer 323 and the third structure bodies 313 are not provided, the area to which an electric field is applied can be increased in the thickness direction of the liquid crystal layer 308, and thus white transmittance can be improved to improve contrast ratio.

Further, by forming the third structure body 313, the interface between the third structure body 313 and the third electrode layer 323 at the side surface of the third structure body 313 and the interface between the third electrode layer 323 and the liquid crystal layer 308 can be parallel to the first direction 330 or the second direction 332. Accordingly, birefringence caused by differences in the refractive indices of the third structure body 313, the third electrode layer 323, and the liquid crystal layer 308 can be suppressed; thus, light leakage in a pixel where black display is performed can be reduced to improve contrast ratio.

Note that the liquid crystal display device in FIGS. 7A to 7D is similar to the liquid crystal display device in FIGS. 1A to 1D except for the above differences, and the first substrate 300 corresponds to the first substrate 100, the second substrate 302 corresponds to the second substrate 102, the first polarizing plate 304 corresponds to the first polarizing plate 104, the second polarizing plate 306 corresponds to the second polarizing plate 106, the liquid crystal layer 308 corresponds to the liquid crystal layer 108, the first structure bodies 310 correspond to the first structure bodies 110, the second structure bodies 312 correspond to the second structure bodies 112, the first electrode layer 320 corresponds to the first electrode layer 120, the second electrode layer 322 corresponds to the second electrode layer 122, and the third electrode layer 323 corresponds to the third electrode layer 123; therefore, the description in the above embodiment can be referred to for the details. In addition, the first direction 330 is similar to the first direction 130, the second direction 332 is similar to the second direction 132, and the third direction 334 is similar to the third direction 134.

The above structure is employed in a liquid crystal display device using a horizontal electric field mode, particularly a liquid crystal display device using a liquid crystal exhibiting a blue phase, whereby light leakage in a pixel where black display is performed is reduced and white transmittance is improved, so that contrast ratio can be improved.

The structures and the like described in this embodiment can be combined as appropriate with any of the structures and the like described in the other embodiments.

Embodiment 4

An example of an active matrix liquid crystal display device, in which an active matrix substrate provided with a transistor is used for the liquid crystal display device described in the above embodiment, is described with reference to FIGS. 8A and 8B and FIGS. 9A and 9B.

Figure 8A:
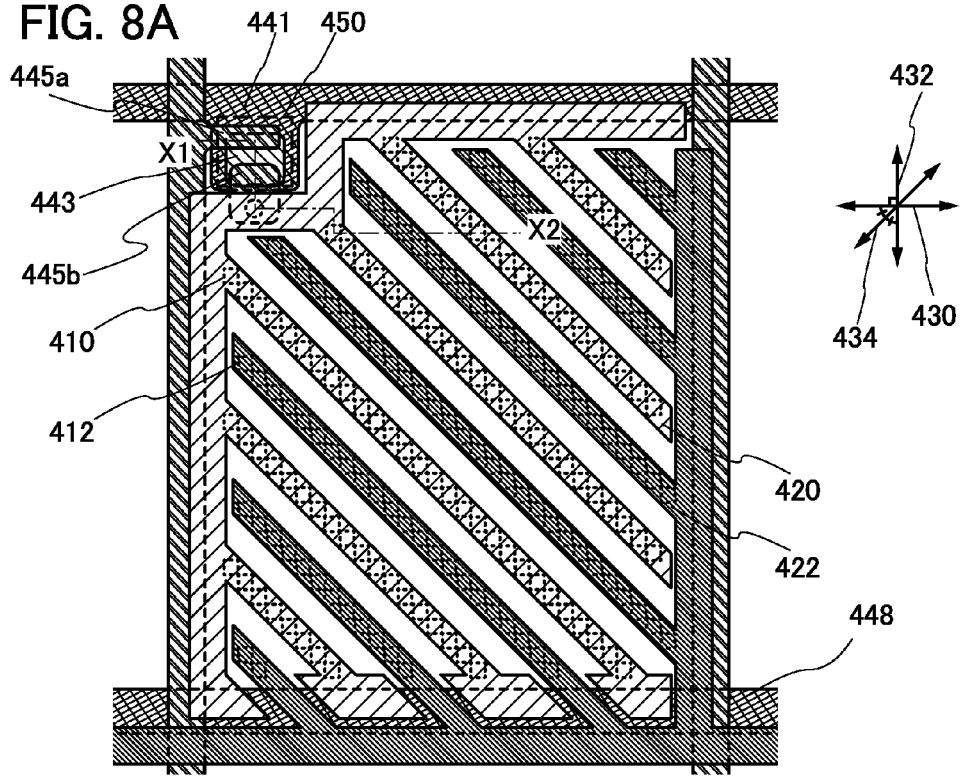
FIGS. 8A and 8B are a plan view and a cross-sectional view which illustrate a liquid crystal display device of one embodiment of the present invention.
Figure 8B:
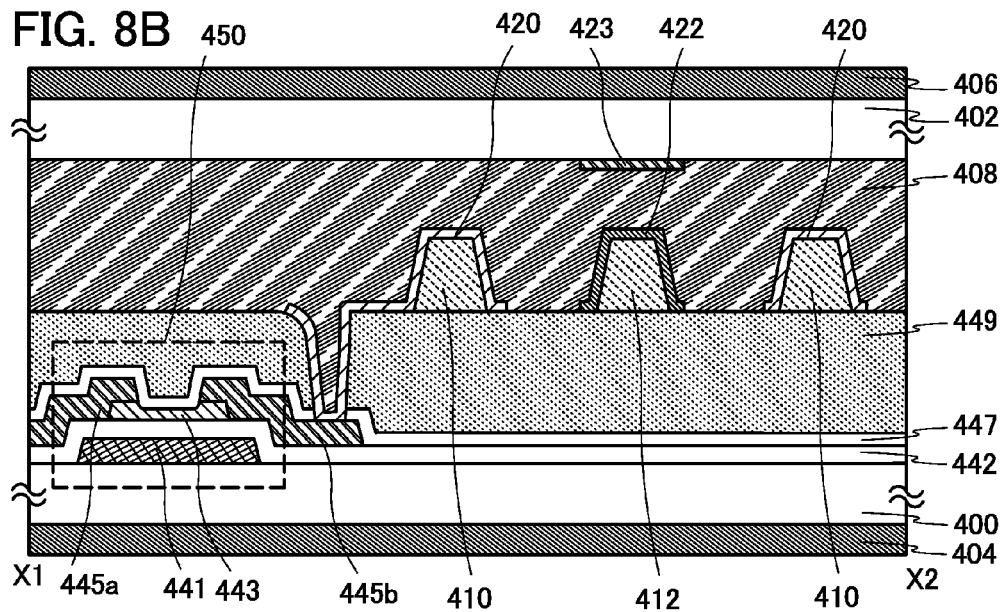

FIG. 8A is a plan view of a liquid crystal display device and illustrates one pixel. In the liquid crystal display device described in this embodiment, a plurality of such pixels is provided in matrix. FIG. 8B is a cross-sectional view taken along dashed-dotted line X1-X2 in FIG. 8A. Note that a third electrode layer 423 which overlaps with a second electrode layer 422, and the like are not illustrated in FIG. 8A for easy understanding of the drawing.

The liquid crystal display device illustrated in FIGS. 8A and 8B includes a first polarizing plate 404 provided for a first substrate 400, a second polarizing plate 406 provided for a second substrate 402, a plurality of first structure bodies 410 provided over the first substrate 400 so as to project from a surface on a liquid crystal layer 408 side into the liquid crystal layer 408, a plurality of second structure bodies 412 provided over the first substrate 400 so as to project from the surface on the liquid crystal layer 408 side into the liquid crystal layer 408, a first electrode layer 420 covering top surfaces and side surfaces of the plurality of first structure bodies 410, the second electrode layer 422 covering top surfaces and side surfaces of the plurality of second structure bodies 412, the third electrode layer 423 provided on a surface of the second substrate 402 on a liquid crystal layer 408 side so as to overlap at least partly with the second electrode layer 422, and the liquid crystal layer 408 provided between the first substrate 400 and the second substrate 402 and in contact with the first electrode layer 420, the second electrode layer 422 and the third electrode layer 423. Here, the first polarizing plate 404 has a polarization axis in a first direction 430 in FIG. 8A, and the second polarizing plate 406 has a polarization axis in a second direction 432 in FIG. 8A that is orthogonal to the first direction 430.

Furthermore, an interface between the side surface of the first structure body 410 and the first electrode layer 420 and an interface between the side surface of the second structure body 412 and the second electrode layer 422 are parallel to the first direction 430 or the second direction 432 in FIG. 8A. The first electrode layer 420 and the second electrode layer 422 are provided so that the direction of an electric field generated in the liquid crystal layer 408 between the first electrode layer 420 and the second electrode layer 422 is a third direction 434 that equally divides an angle formed by the first direction 430 and the second direction 432 as illustrated in FIG. 8A. The first electrode layer 420 and the third electrode layer 423 are provided so that the direction of a planar-direction component of an electric field generated in the liquid crystal layer 408 between the first electrode layer 420 and the third electrode layer 423 is the third direction 434 that equally divides the angle formed by the first direction 430 and the second direction 432 as illustrated in FIG. 8A.

Note the above structure is similar to that of the liquid crystal display device in FIGS. 1A to 1D, and the first substrate 400 corresponds to the first substrate 100, the second substrate 402 corresponds to the second substrate 102, the first polarizing plate 404 corresponds to the first polarizing plate 104, the second polarizing plate 406 corresponds to the second polarizing plate 106, the first structure bodies 410 correspond to the first structure bodies 110, the second structure bodies 412 correspond to the second structure bodies 112, the first electrode layer 420 corresponds to the first electrode layer 120, the second electrode layer 422 corresponds to the second electrode layer 122, the third electrode layer 423 corresponds to the third electrode layer 123, and the liquid crystal layer 408 corresponds to the liquid crystal layer 108; therefore, the description in the above embodiment can be referred to for the details. In addition, the first direction 430 is similar to the first direction 130, the second direction 432 is similar to the second direction 132, and the third direction 434 is similar to the third direction 134.

As illustrated in FIG. 8A, a plurality of source wiring layers (including a source electrode layer 445*a*) is arranged in parallel (extends in the vertical direction in the drawing) so as to be spaced from each other. A plurality of gate wiring layers (including a gate electrode layer 441) extends in a direction orthogonal to the source wiring layers (horizontal direction in the drawing) so as to be spaced from each other. A capacitor wiring layer 448 is provided adjacent to a gate wiring layer in an adjacent pixel and extends in a direction parallel to the gate wiring layers, that is, the direction orthogonal to the source wiring layers (horizontal direction in the drawing). In other words, the gate wiring layers and the capacitor wiring layer 448 are provided in parallel to the first direction 430, and the source wiring layers are provided in parallel to the second direction 432. In this manner, the gate wiring layers, the source wiring layers, and the capacitor wiring layer are provided to be perpendicular or parallel to the polarization axis of the first polarizing plate 404 or the polarization axis of the second polarizing plate 406. Accordingly, birefringence caused by differences in refractive indices can be suppressed at the gate wiring layers, the source wiring layers, and the capacitor wiring layer; thus, light leakage in a pixel where black display is performed can be reduced to improve contrast ratio.

Further, a capacitor is formed in a region where the capacitor wiring layer 448 overlaps with the first electrode layer 420. Note that the capacitor wiring layer 448 is provided adjacent to the gate wiring layer in the adjacent pixel in this embodiment; however, one embodiment of the invention disclosed herein is not limited to this. For example, the capacitor wiring layer 448 may be provided midway between the gate wiring layer in this pixel and the gate wiring layer in the pixel adjacent to this pixel, or a capacitor may be formed in such a manner that the first electrode layer 420 is provided to partly overlap with the gate wiring layer in the adjacent pixel without provision of the capacitor wiring layer 448.

In this embodiment, a substantially rectangular space is formed by the source wiring layers, the capacitor wiring layer 448, and the gate wiring layers. The space corresponds to a pixel region. A transistor 450 for driving the first electrode layer 420 is provided in an upper left corner of the space corresponding to the pixel region.

Further, on the first substrate 400 side in the space corresponding to the pixel region, part of the first electrode layer 420 which functions as a pixel electrode layer of the liquid crystal display device described in this embodiment and part of the second electrode layer 422 which functions as a common electrode layer thereof are arranged to face each other at a given interval with the liquid crystal layer 408 positioned therebetween. On the second substrate 402 side in the space corresponding to the pixel region, part of the third electrode layer 423 which functions as a common electrode layer of the liquid crystal display device described in this embodiment is provided to overlap with the second electrode layer 422.

As illustrated in FIG. 8A, part of the first electrode layer 420 has a hook-like pattern shape (hook-like portion) which is provided along the source wiring layer and the gate wiring layer, and the other part of the first electrode layer 420 has a comb-tooth pattern shape (comb-tooth portion) which branches from the hook-like portion. The comb-tooth portion of the first electrode layer 420 is provided to be orthogonal to the third direction 434 and partly overlaps with the capacitor wiring layer 448.

Further, part of the second electrode layer 422 has a hook-like pattern shape (hook-like portion) which is provided along the source wiring layer in an adjacent pixel and the capacitor wiring layer 448, and the other part of the second electrode layer 422 has a comb-tooth pattern shape (comb-tooth portion) which branches from the hook-like portion. The comb-tooth portion of the second electrode layer 422 is provided to be orthogonal to the third direction 434 and to engage with the comb-tooth portion of the first electrode layer 420. In addition, the hook-like portion of the second electrode layer 422 can function as a common wiring layer by being electrically connected to a second electrode layer in another pixel.

The third electrode layer 423 is provided to overlap at least partly with the second electrode layer 422; in this embodiment, the third electrode layer 423 and the second electrode layer 422 are provided so that end portions thereof are aligned. In other words, part of the third electrode layer 423 has a hook-like pattern shape (hook-like portion) which is provided along the source wiring layer in the adjacent pixel and the capacitor wiring layer 448 so as to overlap with the hook-like portion of the second electrode layer 422, and the other part of the third electrode layer 423 has a comb-tooth pattern shape (comb-tooth portion) which branches from the hook-like portion. The comb-tooth portion of the third electrode layer 423 is provided to be orthogonal to the third direction 434 and to engage with the comb-tooth portion of the first electrode layer 420 while overlapping with the comb-tooth portion of the second electrode layer 422.

Although the second electrode layer 422 and the third electrode layer 423 functioning as common electrode layers can each operate in a floating state (electrically isolated state), the potential of the second electrode layer 422 and the potential of the third electrode layer 423 are each set to a fixed potential, preferably to a potential around a common potential (intermediate potential of an image signal which is transmitted as data) in such a level as not to generate flickers.

Note that there is a case where the third direction 434 divides the angle formed by the first direction 430 and the second direction 432 with a margin of error of ±10° from the angle that is accurately equally divided; therefore, the comb-tooth portion of the first electrode layer 420 and the comb-tooth portion of the second electrode layer 422 can be provided to be angled at 35° to 55° with respect to the first direction 430.

In this manner, without overlapping with each other, the comb-tooth portion of the first electrode layer 420 and the comb-tooth portion of the second electrode layer 422 are provided to face each other at a given interval and to be orthogonal to the third direction 434; the third electrode layer 423 overlaps with the second electrode layer 422; and without overlapping with each other, the comb-tooth portion of the first electrode layer 420 and the comb-tooth portion of the third electrode layer 423 are provided to face each other at a given interval and to be orthogonal to the third direction 434. Thus, light which is converted into linearly polarized light by passing through the first polarizing plate 404 is converted, in the liquid crystal layer 408, into circularly polarized light or elliptically polarized light having a polarization component in the first direction 430 and a polarization component in the second direction 432. Accordingly, when an electric field is applied to the liquid crystal layer 408, that is, when white display is performed in the pixel, the white transmittance of the liquid crystal display device can be improved; thus, the contrast ratio thereof can be improved.

The first electrode layer 420 is formed to cover the top surfaces and side surfaces of the first structure bodies 410 provided to project from a surface of an interlayer film 449 on the liquid crystal layer 408 side, which is over the first substrate 400 (also referred to as an element substrate), into the liquid crystal layer 408. The second electrode layer 422 is formed to cover the top surfaces and side surfaces of the second structure bodies 412 provided to project from the surface of the interlayer film 449 on the liquid crystal layer 408 side, which is over the first substrate 400, into the liquid crystal layer 408.

Thus, since the plurality of first structure bodies 410 and the plurality of second structure bodies 412 are provided so that the top surfaces and side surfaces thereof are covered with at least the comb-tooth portion of the first electrode layer 420 and the comb-tooth portion of the second electrode layer 422, the structure bodies reflect the shapes of the electrode layers. That is, the plurality of first structure bodies 410 and the plurality of second structure bodies 412 are arranged to face each other at a given interval and to be orthogonal to the third direction 434. Note that, in the liquid crystal display device described in this embodiment, an electric field is applied in the third direction 434 to the liquid crystal layer 408 in the pixel region. Therefore, the first structure body 410 and the second structure body 412 are not necessarily provided under the hook-like portion of the first electrode layer 420 and the hook-like portion of the second electrode layer 422, respectively.

As described above, the interface between the side surface of the first structure body 410 and the first electrode layer 420 and the interface between the side surface of the second structure body 412 and the second electrode layer 422 are parallel to the first direction 430 or the second direction 432 in FIG. 8A. Accordingly, birefringence caused by differences in the refractive indices of the first structure body 410, the first electrode layer 420, and the liquid crystal layer 408 and birefringence caused by differences in the refractive indices of the second structure body 412, the second electrode layer 422, and the liquid crystal layer 408 can be suppressed; thus, light leakage in a pixel where black display is performed can be reduced to improve contrast ratio.

Note that the planar shapes of the first electrode layer, the second electrode layer, and the third electrode layer of the liquid crystal display device of one embodiment of the invention disclosed herein are not limited those illustrated in FIG. 8A. For example, shapes illustrated in plan views of FIGS. 9A and 9B may be employed. Note that the third electrode layer 423 which overlaps with the second electrode layer 422, and the like are not illustrated in FIGS. 9A and 9B for easy understanding of the drawing.

Liquid crystal display devices illustrated in FIGS. 9A and 9B are the same as the liquid crystal display device illustrated in FIGS. 8A and 8B except for the shapes of the first electrode layer, the second electrode layer, and the third electrode layer and the directions of the polarization axes of the first polarizing plate 404 and the second polarizing plate 406.

In the liquid crystal display device illustrated in FIG. 9A, a gate wiring layer and the capacitor wiring layer 448 are provided in parallel to the third direction 434 that equally divides the angle formed by the first direction 430 and the second direction 432, and a source wiring layer is provided to be orthogonal to the third direction 434.

In the liquid crystal display device illustrated in FIG. 9A, part of the first electrode layer 420 has a hook-like pattern shape (hook-like portion) which is provided along the gate wiring layer, and the other part of the first electrode layer 420 has a comb-tooth pattern shape (comb-tooth portion) which branches from the hook-like portion. The comb-tooth portion of the first electrode layer 420 is provided to be orthogonal to the third direction 434 and partly overlaps with the capacitor wiring layer 448. Part of the second electrode layer 422 has a linear pattern shape (linear portion) which is provided along the capacitor wiring layer 448, and the other part of the second electrode layer 422 has a comb-tooth pattern shape (comb-tooth portion) which branches from the linear portion. The comb-tooth portion of the second electrode layer 422 is provided to be orthogonal to the third direction 434 and to engage with the comb-tooth portion of the first electrode layer 420. In addition, as in the liquid crystal display device illustrated in FIGS. 8A and 8B, the third electrode layer 423 overlaps with the second electrode layer 422.

In the liquid crystal display device illustrated in FIG. 9B, a gate wiring layer and the capacitor wiring layer 448 are provided in parallel to the first direction 430, and a source wiring layer is provided in parallel to the second direction 432.

In the liquid crystal display device illustrated in FIG. 9B, part of the first electrode layer 420 has a linear pattern shape (linear portion) which is provided in parallel to the gate wiring layer, and the other part of the first electrode layer 420 has a comb-tooth pattern shape (comb-tooth portion) which branches from the linear portion. Part of the second electrode layer 422 has a linear pattern shape (linear portion) which is provided along the capacitor wiring layer 448, and the other part of the second electrode layer 422 has a comb-tooth pattern shape (comb-tooth portion) which branches from the linear portion. In addition, as in the liquid crystal display device illustrated in FIGS. 8A and 8B, the third electrode layer 423 overlaps with the second electrode layer 422.

Here, the comb-tooth portion of the first electrode layer 420, the comb-tooth portion of the second electrode layer 422, and the comb-tooth portion of the third electrode layer 423 each have a portion bending at a right angle, and are provided to be parallel to a third direction 434a that equally divides the angle formed by the first direction 430 and the second direction 432 or a fourth direction 434b that is orthogonal to the third direction 434a. Note that, in this specification and the like, the term "right angle" means not only an accurately right angle but also an angle within $\pm 10°$ from the accurately right angle.

Since the comb-tooth portion of the first electrode layer 420 and the comb-tooth portion of the second electrode layer 422 or the comb-tooth portion of the third electrode layer 423 are provided to engage with each other, an electric field is applied in the third direction 434a or the fourth direction 434b to the liquid crystal layer 408 between the comb-tooth portion of the first electrode layer 420 and the comb-tooth portion of the second electrode layer 422 or the comb-tooth portion of the third electrode layer 423. Note that part of the comb-tooth portion of the first electrode layer 420 overlaps with the capacitor wiring layer 448.

As illustrated in FIG. 8B, the transistor 450 is an inverted-staggered thin film transistor which includes, over the first substrate 400 having an insulating surface, the gate electrode layer 441, a gate insulating layer 442, a semiconductor layer 443, the source electrode layer 445a, and a drain electrode layer 445b. An insulating layer 447 serving as a protective insulating layer is provided to cover the transistor 450, and the interlayer film 449 is stacked over the insulating layer 447. Further, the drain electrode layer 445b of the transistor 450 is electrically connected to the first electrode layer 420 through an opening formed in the insulating layer 447 and the interlayer film 449. Note that a bottom-gate inverted-staggered transistor is used as the transistor 450 in this embodiment;

however, without limitation to this, a top-gate transistor or a coplanar transistor may be used for example.

Although the first electrode layer 420 is in direct contact with the drain electrode layer 445b of the transistor 450 in this embodiment, it is also possible to form an electrode layer in contact with the drain electrode layer 445b and form the first electrode layer 420 so as to be electrically connected to the drain electrode layer 445b through the electrode layer.

Further, an insulating film serving as a base film may be provided between the first substrate 400 and the gate electrode layer 441. The base film has a function of preventing diffusion of an impurity element from the first substrate 400 and can be formed to have a single-layer structure or a stacked-layer structure including one or more films selected from a silicon nitride film, a silicon oxide film, a silicon nitride oxide film, and a silicon oxynitride film.

The gate electrode layer 441 (including the gate wiring layers) can be formed to have a single-layer structure or a stacked-layer structure using any of metal materials such as molybdenum, titanium, tantalum, tungsten, aluminum, copper, neodymium, and scandium and an alloy material containing any of these metal materials as a main component. Alternatively, a conductive film used for the gate electrode layer 441 (including the gate wiring layers) may be formed using a conductive metal oxide. As the conductive metal oxide, indium oxide ($In_2O_3$), tin oxide ($SnO_2$), zinc oxide (ZnO), indium tin oxide ($In_2O_3$—$SnO_2$, abbreviated to ITO), indium zinc oxide ($In_2O_3$—ZnO), or any of these metal oxide materials containing silicon oxide can be used.

The gate insulating layer 442 can be formed by a plasma CVD method, a sputtering method, or the like to have a single-layer structure or a stacked-layer structure including any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a gallium oxide layer, and a hafnium oxide layer.

A conductive film used for the source electrode layer 445a (including the source wiring layers) and the drain electrode layer 445b can be formed using a material similar to that for the gate electrode layer 441.

The semiconductor layer 443 can be formed using any of the following materials: an amorphous semiconductor (hereinafter also referred to as "AS") formed by a vapor-phase growth method using a semiconductor source gas typified by silane or germane or a sputtering method; a polycrystalline semiconductor formed by crystallizing the amorphous semiconductor with the use of light energy or thermal energy; a microcrystalline semiconductor (also referred to as a semi-amorphous semiconductor or a microcrystal semiconductor; hereinafter also referred to as "SAS"); and the like. These semiconductor layers can be formed by a sputtering method, an LPCVD method, a plasma CVD method, or the like.

Considering Gibbs free energy, the microcrystalline semiconductor is in a metastable state that is intermediate between an amorphous state and a single crystal state. That is, the microcrystalline semiconductor is a semiconductor having a third state which is stable in terms of free energy and has a short range order and lattice distortion. Columnar or needle-like crystals grow in a normal direction with respect to a substrate surface. The Raman spectrum of microcrystalline silicon, which is a typical example of a microcrystalline semiconductor, is located in lower wave numbers than 520 $cm^{-1}$, which represents a peak of the Raman spectrum of single crystal silicon. That is, the peak of the Raman spectrum of microcrystalline silicon exists between 520 $cm^{-1}$, which represents single crystal silicon, and 480 $cm^{-1}$, which represents amorphous silicon. In addition, microcrystalline silicon contains at least 1 at. % or more of hydrogen or halogen in order to terminate a dangling bond. Moreover, microcrystalline silicon contains a rare gas element such as helium, argon, krypton, or neon to further promote lattice distortion, so that stability is increased and a favorable microcrystalline semiconductor can be obtained.

A typical example of an amorphous semiconductor is hydrogenated amorphous silicon, while a typical example of a crystalline semiconductor is polysilicon. Examples of polysilicon (polycrystalline silicon) include high-temperature polysilicon which contains polysilicon as a main component and is formed at a process temperature higher than or equal to 800° C., low-temperature polysilicon which contains polysilicon as a main component and is formed at a process temperature lower than or equal to 600° C., and polysilicon obtained by crystallizing amorphous silicon with the use of an element promoting crystallization or the like. Needless to say, a microcrystalline semiconductor or a semiconductor that includes a crystal phase in part of a semiconductor layer can be used as described above.

As a semiconductor material, a compound semiconductor such as GaAs, InP, SiC, ZnSe, GaN, or SiGe as well as an element such as silicon (Si) or germanium (Ge) can be used.

Alternatively, the semiconductor layer 443 can be formed using an oxide semiconductor film. An oxide semiconductor used for the semiconductor layer 443 contains at least indium (In). In particular, In and zinc (Zn) are preferably contained. In addition, as a stabilizer for reducing variation in electric characteristics of a transistor using the oxide semiconductor film, gallium (Ga) is preferably contained in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor, for example, any of the following can be used: indium oxide; tin oxide; zinc oxide; a two-component metal oxide such as an In—Zn-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; and a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, for example, an "In—Ga—Zn—O-based oxide" means an oxide containing In, Ga, and Zn as main components and there is no particular limitation on the ratio of In, Ga, and Zn. The In—Ga—Zn-based oxide may contain a metal element other than In, Ga, and Zn.

A material represented by $InMO_3(ZnO)_m$ (m>0, m is not an integer) may be used as the oxide semiconductor. Note that M represents one or more metal elements selected from Ga, Fe, Mn, and Co. Alternatively, as the oxide semiconductor, a material represented by $In_2SnO_5(ZnO)_n$ (n>0, n is an integer) may be used.

The oxide semiconductor film used for the semiconductor layer 443 can be in a single crystal state, a polycrystalline (also referred to as polycrystal) state, an amorphous state, or the like.

The oxide semiconductor film used for the semiconductor layer 443 is preferably a c-axis aligned crystalline oxide semiconductor (CAAC-OS) film.

The CAAC-OS film is not completely single crystal nor completely amorphous. The CAAC-OS film is an oxide semiconductor film with a crystal-amorphous mixed phase structure where crystal parts are included in an amorphous phase. Note that, in most cases, the crystal part fits inside a cube whose one side is less than 100 nm. From an observation image obtained with a transmission electron microscope (TEM), a boundary between an amorphous part and a crystal part in the CAAC-OS film is not clear. Further, with the TEM, a grain boundary in the CAAC-OS film is not found. Thus, in the CAAC-OS film, a decrease in electron mobility due to the grain boundary is suppressed.

In each of the crystal parts included in the CAAC-OS film, a c-axis is aligned in a direction parallel to a normal vector of a surface where the CAAC-OS film is formed or a normal vector of a surface of the CAAC-OS film, triangular or hexagonal atomic arrangement is formed when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, the expression "perpendicular to the a-b plane or the c-axis" includes a range from 85° to 95°. In addition, the expression "parallel to the a-b plane or the c-axis" includes a range from −5° to 5°.

In the CAAC-OS film, the distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to the normal vector of the surface where the CAAC-OS film is formed or the normal vector of the surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that, when the CAAC-OS film is formed, the direction of the c-axis of the crystal part is the direction parallel to the normal vector of the surface where the CAAC-OS film is formed or the normal vector of the surface of the CAAC-OS film. The crystal part is formed by film formation or by performing treatment for crystallization such as heat treatment after film formation.

In a transistor formed using the CAAC-OS film, change in electric characteristics due to irradiation with visible light or ultraviolet light is small. Thus, the transistor has high reliability.

It is preferable to form the oxide semiconductor film by a method by which hydrogen, water, and the like do not easily enter the oxide semiconductor film. For example, a sputtering method can be used. The oxide semiconductor film may be formed in a rare gas (typically argon) atmosphere, an oxygen atmosphere, a mixed atmosphere of a rare gas and oxygen, or the like. Moreover, it is preferable that an atmosphere using a high-purity gas from which impurities containing hydrogen atoms, such as hydrogen, water, a hydroxyl group, and hydride, are sufficiently removed be used because entry of hydrogen, water, a hydroxyl group, hydride, and the like into the oxide semiconductor film can be prevented. Further, the oxide semiconductor film is preferably subjected to heat treatment after being formed. By performing heat treatment, impurities such as water and hydrogen in the oxide semiconductor film can be removed; alternatively, oxygen can be supplied to the oxide semiconductor film.

By using such an oxide semiconductor film for the semiconductor layer 443, a current value in an off state (off-state current value) can be small. Accordingly, an electric signal such as an image signal can be held for a longer time, and a writing interval can be set longer in an on state. Accordingly, the frequency of refresh operation can be reduced, which leads to an effect of suppressing power consumption.

In a process for forming the semiconductor layer, the electrode layer, and the wiring layer, an etching step is used to process thin films into desired shapes. Dry etching or wet etching can be used for the etching step.

As an etching apparatus used for dry etching, an etching apparatus using a reactive ion etching method (RIE method), or a dry etching apparatus using a high-density plasma source such as electron cyclotron resonance (ECR) or inductively coupled plasma (ICP) can be used.

In order to etch the films into desired shapes, the etching conditions (the amount of electric power applied to a coil-shaped electrode, the amount of electric power applied to an electrode on a substrate side, the temperature of the electrode on the substrate side, and the like) are adjusted as appropriate.

The etching conditions (an etchant, etching time, temperature, and the like) are adjusted as appropriate in accordance with the material so that the films can be etched into desired shapes.

Note that the semiconductor layer 443 of the transistor 450 is an example of a semiconductor layer which is partly etched and has a groove (depressed portion).

An inorganic insulating film or an organic insulating film formed by a dry method or a wet method can be used for the insulating layer 447 covering the transistor 450. For example, it is possible to use a single-layer structure or a stacked-layer structure including any of a silicon nitride film, a silicon oxide film, a silicon oxynitride film, an aluminum oxide film, a tantalum oxide film, and a gallium oxide film which are formed by a CVD method, a sputtering method, or the like.

Further, an organic material such as polyimide, acrylic, benzocyclobutene, polyamide, or epoxy can be used for the interlayer film 449. Other than such organic materials, it is also possible to use a low-dielectric constant material (low-k material), a siloxane-based resin, phosphosilicate glass (PSG), borophosphosilicate glass (BPSG), or the like.

Note that the siloxane-based resin corresponds to a resin including a Si—O—Si bond formed using a siloxane-based material as a starting material. The siloxane-based resin may include, as a substituent, an organic group (e.g., an alkyl group or an aryl group) or a fluoro group. In addition, the organic group may include a fluoro group.

There is no particular limitation on the method for forming the interlayer film 449, and the following method can be employed depending on the material: spin coating, dip coating, spray coating, a droplet discharge method (such as an ink-jet method), a printing method (such as screen printing or offset printing), roll coating, curtain coating, knife coating, or the like.

Instead of provision of the first structural body 410 and the second structure body 412 over the interlayer film 449, an upper portion of the interlayer film 449 may be directly processed to have a concavo-convex shape.

Although not illustrated in FIGS. 8A and 8B, an optical film or the like, such as a retardation plate or an anti-reflection film, can be provided as appropriate. A coloring layer which functions as a color filter layer can be further provided. In addition, a backlight or the like can be used as a light source.

Such a structure is employed in a liquid crystal display device using a horizontal electric field mode, particularly an active matrix liquid crystal display device using a liquid crystal exhibiting a blue phase, whereby light leakage in a pixel where black display is performed is reduced and the transmittance in a pixel where white display is performed is improved, so that contrast ratio can be improved.

The structures and the like described in this embodiment can be combined as appropriate with any of the structures and the like described in the other embodiments.

Embodiment 5

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, an electronic book reader, a mobile phone (also referred to as a cellular phone or a mobile phone device), a portable game machine, a portable information terminal, an audio reproducing device, and a large-sized game machine such as a pachinko machine.

Figure 10A:
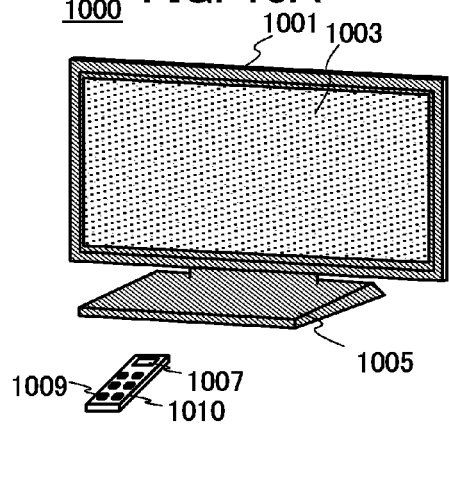
FIGS. 10A to 10F illustrate electronic devices each including a liquid crystal display device of one embodiment of the present invention.

FIG. 10A illustrates an example of a television set. In a television set 1000, a display portion 1003 is incorporated in a housing 1001. The display portion 1003 can display images. Here, the housing 1001 is supported by a stand 1005.

The television set 1000 can be operated with an operation switch of the housing 1001 or a separate remote controller 1010. Channels and volume can be controlled with an operation key 1009 of the remote controller 1010 so that an image displayed on the display portion 1003 can be controlled. Furthermore, the remote controller 1010 may be provided with a display portion 1007 for displaying data output from the remote controller 1010.

The display portion 1003 and the display portion 1007 are manufactured using any of the liquid crystal display devices described in the above embodiments, whereby it is possible to provide the television set 1000 in which light leakage in a pixel where black display is performed is reduced and the transmittance in a pixel where white display is performed is improved, so that contrast ratio is improved.

Note that the television set 1000 is provided with a receiver, a modem, and the like. With the receiver, a general television broadcast can be received. Moreover, when the television set 1000 is connected to a communication network with or without wires via the modem, one-way (from a transmitter to a receiver) or two-way (between a transmitter and a receiver, between receivers, or the like) data communication can be performed.

Figure 10D:
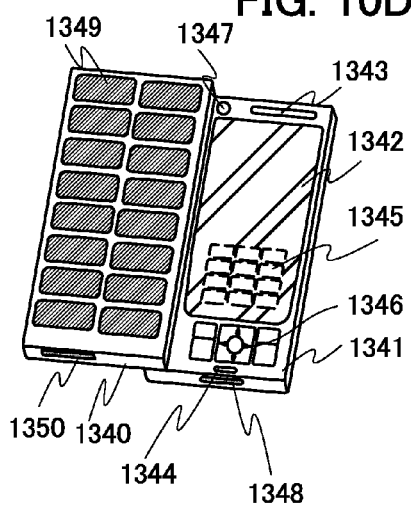
Figure 10B:
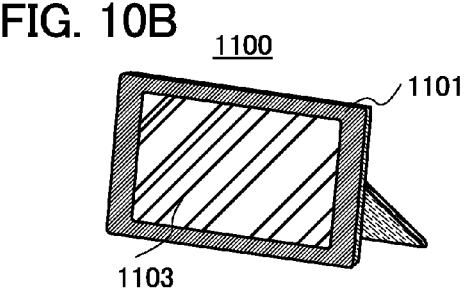

FIG. 10B illustrates an example of a digital photo frame. In a digital photo frame 1100, for example, a display portion 1103 is incorporated in a housing 1101. The display portion 1103 can display a variety of images. For example, the display portion 1103 can display data of an image taken with a digital camera or the like and function as a normal photo frame.

Note that the digital photo frame 1100 is provided with an operation portion, an external connection terminal (such as a USB terminal or a terminal that can be connected to a variety of cables such as a USB cable), a recording medium insertion portion, and the like. Although these components may be provided on the surface on which the display portion is provided, it is preferable to provide them on the side surface or the back surface for the design of the digital photo frame 1100. For example, a memory that stores data of an image taken with a digital camera is inserted in the recording medium insertion portion of the digital photo frame, and the image data can be transferred and displayed on the display portion 1103.

The display portion 1103 is manufactured using any of the liquid crystal display devices described in the above embodiments, whereby it is possible to provide the digital photo frame 1100 in which light leakage in a pixel where black display is performed is reduced and the transmittance in a pixel where white display is performed is improved, so that contrast ratio is improved.

The digital photo frame 1100 may have a configuration capable of wirelessly transmitting and receiving data. Through wireless communication, desired image data can be transferred to be displayed.

Figure 10E:
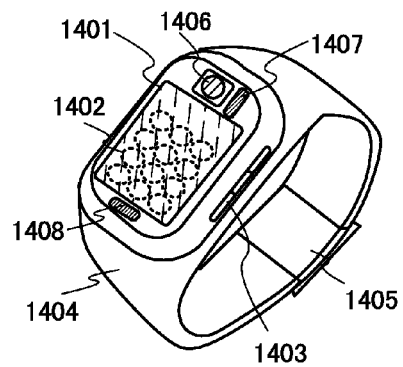
Figure 10C:
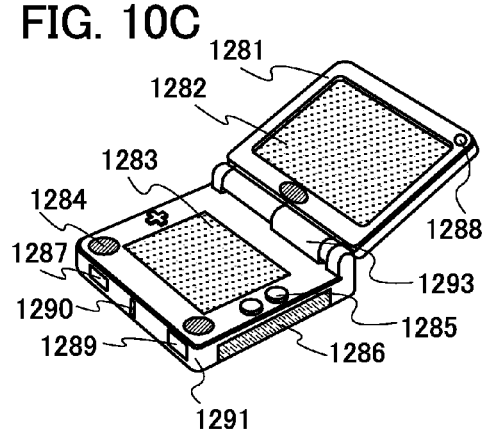

FIG. 10C illustrates a portable game machine including two housings, a housing 1281 and a housing 1291 which are jointed with a connector 1293 so that the portable game machine can be opened and folded. A display portion 1282 is incorporated in the housing 1281, and a display portion 1283 is incorporated in the housing 1291. In addition, the portable game machine illustrated in FIG. 10C includes a speaker portion 1284, a recording medium insertion portion 1286, an LED lamp 1290, input means (an operation key 1285, a connection terminal 1287, a sensor 1288 (having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, vibration, odor, or infrared rays), and a microphone 1289), and the like. Needless to say, the structure of the portable game machine is not limited to the above, and may be any structure which is provided with at least a liquid crystal display device disclosed in this specification. Moreover, another accessory may be provided as appropriate. The portable game machine illustrated in FIG. 10C has a function of reading a program or data stored in a storage medium to display it on the display portion, and a function of sharing information with another portable game machine by wireless communication. The portable game machine illustrated in FIG. 10C can have a variety of functions without limitation to the above.

The display portion 1282 and the display portion 1283 are manufactured using any of the liquid crystal display devices described in the above embodiments, whereby it is possible to provide a portable game machine in which light leakage in a pixel where black display is performed is reduced and the transmittance in a pixel where white display is performed is improved, so that contrast ratio is improved.

FIG. 10D illustrates a mobile phone including two housings, a housing 1340 and a housing 1341. Moreover, the housing 1340 and the housing 1341 which are developed as illustrated in FIG. 10D can slide to overlap with each other. Thus, the mobile phone can have a small size suitable for portable use. Further, the housing 1341 includes a display panel 1342, a speaker 1343, a microphone 1344, a pointing device 1346, a camera lens 1347, an external connection terminal 1348, and the like. The housing 1340 includes a solar cell 1349 for charging the mobile phone, an external memory slot 1350, and the like. Further, the display panel 1342 is provided with a touch panel. In FIG. 10D, a plurality of operation keys 1345 displayed as images is indicated by dashed lines. An antenna is incorporated in the housing 1341.

The display panel 1342 is manufactured using any of the liquid crystal display devices described in the above embodiments, whereby it is possible to provide a mobile phone in which light leakage in a pixel where black display is performed is reduced and the transmittance in a pixel where white display is performed is improved, so that contrast ratio is improved.

FIG. 10E is a perspective view of an example of a mobile phone that the user can wear on the wrist like a wristwatch.

This mobile phone includes a main body which includes a communication device having at least a telephone function, and a battery; a band portion 1404 which enables the main body to be worn on the wrist; an adjusting portion 1405 for adjusting the band portion 1404 to fit the wrist; a display portion 1401; a speaker 1407; and a microphone 1408.

In addition, the main body includes operation switches 1403. The operation switches 1403 can serve, for example, as a switch for starting a program for the Internet when the switch is pushed, in addition to serving as a switch for turning on a power source, a switch for shifting a display, a switch for instructing to start taking images, or the like, and can be used so as to correspond to each function.

A user can input data to this mobile phone by touching the display portion 1401 with a finger, an input pen, or the like, operating the operation switches 1403, or inputting voice to the microphone 1408. In FIG. 10E, display buttons 1402 are displayed on the display portion 1401. A user can input data by touching the display buttons 1402 with a finger or the like.

Further, the main body includes a camera portion 1406 including an image pick-up means having a function of converting an image of an object, which is formed through a camera lens, into an electronic image signal. Note that the camera portion is not necessarily provided.

The mobile phone illustrated in FIG. 10E may be provided with a receiver of a television broadcast or the like, and thus can display an image on the display portion 1401 by receiving a television broadcast. In addition, the mobile phone may be provided with a storage device such as a memory, or the like, and thus can record a television broadcast in the memory. The mobile phone illustrated in FIG. 10E may have a function of collecting location information, such as GPS.

The display portion 1401 is manufactured using any of the liquid crystal display devices described in the above embodiments, whereby it is possible to provide a mobile phone in which light leakage in a pixel where black display is performed is reduced and the transmittance in a pixel where white display is performed is improved, so that contrast ratio is improved.

Figure 10F:
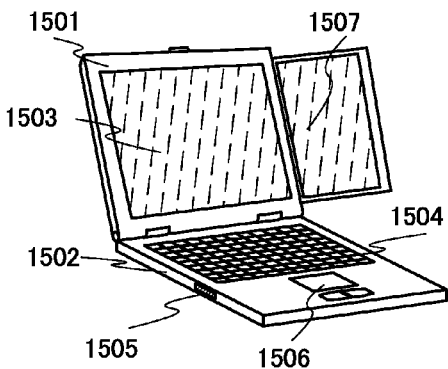

FIG. 10F is a perspective view of an example of a portable computer.

In the portable computer in FIG. 10F, a top housing 1501 having a display portion 1503 and a bottom housing 1502 having a keyboard 1504 can overlap with each other by closing a hinge unit which connects the top housing 1501 and the bottom housing 1502. Thus, the portable computer is convenient for carrying around. Moreover, in the case of using the keyboard for input of data, the hinge unit is opened so that a user can input data looking at the display portion 1503.

The bottom housing 1502 includes a pointing device 1506 with which input operation is performed, in addition to the keyboard 1504. When the display portion 1503 is a touch input panel, the user can input data by touching part of the display portion. The bottom housing 1502 includes an arithmetic function portion such as a CPU or hard disk. In addition, the bottom housing 1502 includes an external connection port 1505 into which another device such as a communication cable conformable to communication standards of a USB is inserted.

The top housing 1501 further includes a display portion 1507 which can be stored in the top housing 1501 by being slid. Thus, a large display screen can be realized. In addition, the user can adjust the orientation of a screen of the storable display portion 1507. When the storable display portion 1507 is a touch input panel, the user can input data by touching part of the storable display portion.

The display portion 1503 and the storable display portion 1507 are manufactured using any of the liquid crystal display devices described in the above embodiments, whereby it is possible to provide a portable computer in which light leakage in a pixel where black display is performed is reduced and the transmittance in a pixel where white display is performed is improved, so that contrast ratio is improved.

In addition, the portable computer in FIG. 10F can be provided with a receiver or the like and can receive a television broadcast to display an image on the display portion. The user can watch a television broadcast when the whole screen of the display portion 1507 is exposed by sliding the display portion 1507 and the angle of the screen is adjusted while the hinge unit which connects the top housing 1501 and the bottom housing 1502 is kept closed. In this case, the hinge unit is not opened and display is not performed on the display portion 1503. In addition, start up of only a circuit for displaying the television broadcast is performed. Therefore, power can be consumed to the minimum, which is advantageous to the portable computer whose battery capacity is limited.

The structures and the like described in this embodiment can be combined as appropriate with any of the structures and the like described in the other embodiments.

REFERENCE NUMERALS

100: first substrate, 102: second substrate, 104: first polarizing plate, 106: second polarizing plate, 108: liquid crystal layer, 110: first structure body, 110a: first structure body, 110b: first structure body, 112: second structure body, 112a: second structure body, 112b: second structure body, 120: first electrode layer, 122: second electrode layer, 123: third electrode layer, 130: first direction, 132: second direction, 134: third direction, 140: first structure body, 142: second structure body, 150: region, 152: region, 154: region, 160: incident light, 162: first polarized light, 162a: interface-parallel component, 162b: interface-perpendicular component, 164: second polarized light, 166: emission light, 170: second polarized light, 172: second polarized light, 180: first structure body, 182: second structure body, 190: first structure body, 192: second structure body, 200: first substrate, 202: second substrate, 204: first polarizing plate, 206: second polarizing plate, 208: liquid crystal layer, 210: first structure body, 212: second structure body, 220: first electrode layer, 222: second electrode layer, 223: third electrode layer, 230: first direction, 232: second direction, 234: third direction, 250: region, 300: first substrate, 302: second substrate, 304: first polarizing plate, 306: second polarizing plate, 308: liquid crystal layer, 310: first structure body, 312: second structure body, 313:

third structure body, 320: first electrode layer, 322: second electrode layer, 323: third electrode layer, 330: first direction, 332: second direction, 334: third direction, 400: first substrate, 402: second substrate, 404: first polarizing plate, 406: second polarizing plate, 408: liquid crystal layer, 410: first structure body, 412: second structure body, 420: first electrode layer, 422: second electrode layer, 423: third electrode layer, 430: first direction, 432: second direction, 434: third direction, 434a: third direction, 434b: fourth direction, 441: gate electrode layer, 442: gate insulating layer, 443: semiconductor layer, 445a: source electrode layer, 445b: drain electrode layer, 447: insulating layer, 448: capacitor wiring layer, 449: interlayer film, 450: transistor, 1000: television set, 1001: housing, 1003: display portion, 1005: stand, 1007: display portion, 1009: operation key, 1010: remote controller, 1100: digital photo frame, 1101: housing, 1103: display portion, 1281: housing, 1282: display portion, 1283: display portion, 1284: speaker portion, 1285: operation key, 1286: recording medium insertion portion, 1287: connection terminal, 1288: sensor, 1289: microphone, 1290: LED lamp, 1291: housing, 1293: connector, 1340: housing, 1341: housing, 1342: display panel, 1343: speaker, 1344: microphone, 1345: operation key, 1346: pointing device, 1347: camera lens, 1348: external connection terminal, 1349: solar cell, 1350: external memory slot, 1401: display portion, 1402: display button, 1403: operation switch, 1404: band portion, 1405: adjusting portion, 1406: camera portion, 1407: speaker, 1408: microphone, 1501: top housing, 1502: bottom housing, 1503: display portion, 1504: keyboard, 1505: external connection port, 1506: pointing device, and 1507: display portion.

This application is based on Japanese Patent Application serial no. 2011-258959 filed with the Japan Patent Office on Nov. 28, 2011, the entire contents of which are hereby incorporated by reference.

The invention claimed is:

1. A liquid crystal display device comprising:
a first polarizing plate adjacent to a first substrate, the first polarizing plate having a first polarization axis along a first direction;
a second polarizing plate adjacent to a second substrate, the second polarizing plate having a second polarization axis along a second direction substantially orthogonal to the first direction;
a liquid crystal layer between the first substrate and the second substrate;
a plurality of first structure bodies adjacent to the first substrate on a liquid crystal layer side, the plurality of first structure bodies projecting into the liquid crystal layer;
a plurality of second structure bodies adjacent to the first substrate on the liquid crystal layer side, the plurality of second structure bodies projecting into the liquid crystal layer;
a first electrode layer covering top surfaces and side surfaces of the plurality of first structure bodies;
a second electrode layer covering top surfaces and side surfaces of the plurality of second structure bodies; and
a third electrode layer adjacent to the second substrate on a liquid crystal layer side, the third electrode layer overlapping at least partly with the second electrode layer,
wherein a first interface between the side surfaces of the first structure bodies and the first electrode layer, and a second interface between the side surfaces of the second structure bodies and the second electrode layer are substantially parallel to the first direction or the second direction, and
wherein a direction of a planar-direction component of an electric field generated in the liquid crystal layer between the first electrode layer and the third electrode layer is a third direction which equally divides an angle between the first direction and the second direction.

2. The liquid crystal display device according to claim 1,
wherein the plurality of first structure bodies is arranged to be substantially orthogonal to the third direction,
wherein the plurality of second structure bodies is arranged to face a row of the plurality of first structure bodies at a given interval and to be substantially orthogonal to the third direction,
wherein the first electrode layer and the second electrode layer are provided to face each other at a given interval and to be substantially orthogonal to the third direction, and
wherein the third electrode layer is provided to be substantially orthogonal to the third direction.

3. The liquid crystal display device according to claim 1,
wherein the first structure bodies and the second structure bodies each have a substantially square-shaped bottom surface.

4. The liquid crystal display device according to claim 3,
wherein corner portions of bottom surfaces of the plurality of first structure bodies and corner portions formed between the top surfaces and bottom surfaces of the first structure bodies are chamfered in a circular arc shape,
wherein the first structure bodies are connected in a row,
wherein corner portions of bottom surfaces of the plurality of second structure bodies and corner portions formed between the top surfaces and bottom surfaces of the second structure bodies are chamfered in a circular arc shape, and
wherein the second structure bodies are connected in a row.

5. The liquid crystal display device according to claim 4,
wherein the first electrode layer is provided so that the corner portions of the bottom surfaces of the plurality of first structure bodies and the corner portions formed between the top surfaces and bottom surfaces of the first structure bodies, which are chamfered in the circular arc shape, are partly exposed, and
wherein the second electrode layer is provided so that the corner portions of the bottom surfaces of the plurality of second structure bodies and the corner portions formed between the top surfaces and bottom surfaces of the second structure bodies, which are chamfered in the circular arc shape, are partly exposed.

6. The liquid crystal display device according to claim 5,
wherein a width of the first electrode layer in the third direction is smaller than a width of a first structure body of the first structure bodies in the third direction, and
wherein a width of the second electrode layer in the third direction is smaller than a width of a second structure body of the second structure bodies in the third direction.

7. The liquid crystal display device according to claim 1,
wherein the first electrode layer, the first structure bodies, the second electrode layer, the second structure bodies, and the third electrode layer each have a light-transmitting property.

8. The liquid crystal display device according to claim 1,
wherein the side surfaces of the first structure bodies and the side surfaces of the second structure bodies are tilted toward the first substrate.

9. The liquid crystal display device according to claim 1,
wherein the first electrode layer, the second electrode layer, and the third electrode layer each have a comb-like shape.

10. The liquid crystal display device according to claim 1, wherein the liquid crystal layer comprises a liquid crystal material exhibiting a blue phase.

11. The liquid crystal display device according to claim 1, further comprising a transistor between the first substrate and the first electrode layer,
wherein the first electrode layer is electrically connected to a source or a drain of the transistor.

12. A liquid crystal display device comprising:
a first polarizing plate adjacent to a first substrate, the first polarizing plate having a first polarization axis along a first direction;
a second polarizing plate adjacent to a second substrate, the second polarizing plate having a second polarization axis along a second direction substantially orthogonal to the first direction;
a liquid crystal layer between the first substrate and the second substrate;
a plurality of first structure bodies adjacent to the first substrate on a liquid crystal layer side, the plurality of first structure bodies projecting into the liquid crystal layer;
a plurality of second structure bodies adjacent to the first substrate on the liquid crystal layer side, the plurality of second structure bodies projecting into the liquid crystal layer;
a plurality of third structure bodies adjacent to the second substrate on a liquid crystal layer side, the plurality of third structure bodies projecting into the liquid crystal layer and overlapping at least partly with the plurality of second structure bodies;
a first electrode layer covering top surfaces and side surfaces of the plurality of first structure bodies;
a second electrode layer covering top surfaces and side surfaces of the plurality of second structure bodies; and
a third electrode layer covering bottom surfaces and side surfaces of the plurality of third structure bodies, the third electrode overlapping at least partly with the second electrode layer,
wherein a first interface between the side surfaces of the first structure bodies and the first electrode layer, a second interface between the side surfaces of the second structure bodies and the second electrode layer, and a third interface between the side surfaces of the third structure bodies and the third electrode layer are substantially parallel to the first direction or the second direction, and
wherein a direction of a planar-direction component of an electric field generated in the liquid crystal layer between the first electrode layer and the third electrode layer is a third direction which equally divides an angle between the first direction and the second direction.

13. The liquid crystal display device according to claim 12,
wherein the plurality of first structure bodies is arranged to be substantially orthogonal to the third direction,
wherein the plurality of second structure bodies is arranged to face a row of the plurality of first structure bodies at a given interval and to be substantially orthogonal to the third direction,
wherein the plurality of third structure bodies is arranged to overlap at least partly with the plurality of second structure bodies and to be substantially orthogonal to the third direction,
wherein the first electrode layer and the second electrode layer are provided to face each other at a given interval and to be substantially orthogonal to the third direction, and
wherein the third electrode layer is provided to be substantially orthogonal to the third direction.

14. The liquid crystal display device according to claim 12,
wherein the first structure bodies, the second structure bodies, and the third structure bodies each have a substantially square-shaped bottom surface.

15. The liquid crystal display device according to claim 12,
wherein the first electrode layer, the first structure bodies, the second electrode layer, the second structure bodies, the third electrode layer, and the third structure bodies each have a light-transmitting property.

16. The liquid crystal display device according to claim 12,
wherein the side surfaces of the first structure bodies and the side surfaces of the second structure bodies are tilted toward the first substrate, and
wherein the side surfaces of the third structure bodies are tilted toward the second substrate.

17. The liquid crystal display device according to claim 12,
wherein the first electrode layer, the second electrode layer, and the third electrode layer each have a comb-like shape.

18. The liquid crystal display device according to claim 12,
wherein the liquid crystal layer comprises a liquid crystal material exhibiting a blue phase.

19. The liquid crystal display device according to claim 12, further comprising a transistor between the first substrate and the first electrode layer,
wherein the first electrode layer is electrically connected to a source or a drain of the transistor.

20. The liquid crystal display device according to claim 12, wherein a thickness of each of the first structure bodies, a thickness of each of the second structure bodies, and a thickness of each of the third structure bodies are substantially the same.

* * * * *